United States Patent [19]
Miller et al.

[11] Patent Number: 6,134,528
[45] Date of Patent: Oct. 17, 2000

[54] METHOD DEVICE AND ARTICLE OF MANUFACTURE FOR NEURAL-NETWORK BASED GENERATION OF POSTLEXICAL PRONUNCIATIONS FROM LEXICAL PRONUNCIATIONS

[75] Inventors: Corey Andrew Miller, Chicago; Orhan Karaali, Rolling Meadows; Noel Massey, Hoffman Estates, all of Ill.

[73] Assignee: Motorola, Inc., Schaumburg, Ill.

[21] Appl. No.: 08/874,834

[22] Filed: Jun. 13, 1997

[51] Int. Cl.[7] ............................. G10L 13/00; G10L 13/06
[52] U.S. Cl. ............................. 704/258; 704/259
[58] Field of Search ............................. 704/232, 255, 704/256, 257, 259, 251, 252, 253, 254, 260, 266, 269, 258

[56] References Cited

U.S. PATENT DOCUMENTS

| | | | |
|---|---|---|---|
| 4,829,580 | 5/1989 | Church | 704/260 |
| 5,033,087 | 7/1991 | Bahl et al. | 704/256 |
| 5,040,218 | 8/1991 | Vitale et al. | 704/260 |
| 5,581,655 | 12/1996 | Cohen et al. | 704/245 |
| 5,668,926 | 9/1997 | Karaali et al. | 704/232 |
| 5,677,988 | 10/1997 | Takami et al. | 704/256 |
| 5,689,616 | 11/1997 | Li | 704/232 |
| 5,745,649 | 4/1998 | Lubensky | 704/232 |
| 5,781,884 | 7/1998 | Pereira et al. | 704/257 |
| 5,799,276 | 8/1998 | Komissarchik et al. | 704/257 |
| 5,930,754 | 7/1999 | Karaali et al. | 704/259 |
| 5,950,162 | 9/1999 | Corrigan et al. | 704/260 |
| 5,970,454 | 10/1999 | Breen | 704/269 |
| 5,987,412 | 11/1999 | Breen | 704/260 |

OTHER PUBLICATIONS

"Parallel Networks that Learn to Pronounce English Text" Terrence J. Sejnowski and Charles R. Rosenberg, Complex Systems 1, 1987, pp. 145–168.

Primary Examiner—David R. Hudspeth
Assistant Examiner—Martin Lerner
Attorney, Agent, or Firm—K. Cyrus Khosravi; Steven R. Santema

[57] ABSTRACT

A method (2000), device (2200) and article of manufacture (2300) provide, in response to lexical pronunciation information, efficient generation of postlexical pronunciation information. A method is presented for providing, in response to a lexical pronunciation, efficient generation of a postlexical pronunciation, including the steps of: determining lexical phones, lexical features, and boundary information for a predetermined portion of text; and utilizing a pretrained neural network that was pretrained using lexical phones, postlexical phones, lexical features, and boundary information to generate a neural network hypothesis for a postlexical pronunciation of the predetermined portion of text.

49 Claims, 12 Drawing Sheets

| LOCATION | 1 | 2 | 3 |
|---|---|---|---|
| LEXICAL | f | ey | t |
| POSTLEXICAL | f | ey | q |

| LOCATION | 1 | 2 | 3 |
|---|---|---|---|
| LEXICAL | ae | n | d |
| POSTLEXICAL | ae | n | + |

| LOCATION | 1 | 2 | 3 |
|---|---|---|---|
| LEXICAL | b | ao | l |
| POSTLEXICAL | B | ao | l |

LEXICAL PRONUNCIATION (1102)

| LOCATION NUMBER | PHONE |
|---|---|
| 1 | ae |
| 2 | n |
| 3 | d |

(1104)
(1106)

FEATURES FOR /ae/ (1108)

| +VOCALIC | +VOWEL | +SONORANT | +CONTINUANT | +FRONT 1 |
|---|---|---|---|---|
| +LOW 1 | +LOW 2 | +VOICED | +LONG | |

STREAM 3 FOR /ae/ (1110)

| 1 | 2 | 3 | 6 | 13 |
|---|---|---|---|---|
| 14 | 27 | 28 | 50 | 53 |

FEATURES FOR /n/ (1112)

| +SONORANT | +OBSTRUENT | +NASAL | +ALVEOLAR | +VOICED |
|---|---|---|---|---|

STREAM 3 FOR /n/ (1114)

| 3 | 4 | 8 | 32 | 50 |
|---|---|---|---|---|

FEATURES FOR /d/ (1116)

| +OBSTRUENT | +ALVEOLAR | +VOICED |
|---|---|---|

STREAM 3 FOR /d/ (1118)

| 4 | 32 | 50 |
|---|---|---|

| PHONE | ih | ax | b |
|---|---|---|---|
| TARGET ($d_k$) | 1 | 0 | 0 |
| HYPOTHESIS ($o_k$) | 0 | 1 | 0 |
| LOCAL ERROR ($d_k - o_k$) | 1 | -1 | 0 |

*PRIOR ART*

*FIG. 18*

| PHONE | ih | ax | b |
|---|---|---|---|
| TARGET ($d_k$) | 1 | 0 | 0 |
| HYPOTHESIS ($O_k$) | 0 | 1 | 0 |
| LOCAL ERROR $M*(d_k - o_k)$ | 1 (M=1) | -.1 (M=.1) | 0 (M=1) |

(2002) DETERMINING LEXICAL PHONES, LEXICAL FEATURES, AND BOUNDARY INFORMATION FOR A PREDETERMINED PORTION OF TEXT

↓

(2004) UTILIZING A PRETRAINED NEURAL NETWORK THAT WAS PRETRAINED USING LEXICAL PHONES, POSTLEXICAL PHONES, LEXICAL FEATURES, AND BOUNDARY INFORMATION TO GENERATE A NEURAL NETWORK HYPOTHESIS FOR A POSTLEXICAL PRONUNCIATION OF THE PREDETERMINED PORTION OF TEXT

METHOD DEVICE AND ARTICLE OF MANUFACTURE FOR NEURAL-NETWORK BASED GENERATION OF POSTLEXICAL PRONUNCIATIONS FROM LEXICAL PRONUNCIATIONS

FIELD OF THE INVENTION

The present invention relates to the generation of postlexical pronunciations from lexical pronunciations, with particular application in the field of speech synthesis.

BACKGROUND OF THE INVENTION

As shown in FIG. 1, numeral 100, text-to-speech synthesis is the conversion of written or printed text (102) into speech (110). Text-to-speech synthesis offers the possibility of providing voice output at a much lower cost than recording speech and playing it back. Speech synthesis is often employed in situations where the text is likely to vary a great deal and where it is simply not possible to record it beforehand.

In a language like English, where the pronunciation of words is often not obvious from the spelling of the words, it is important to convert orthographies (102) into unambiguous phonetic representations (106) by means of a linguistic module (104) before submitting the orthographies to an acoustic module (108) for the generation of speech waveforms (110). In order to produce phonetic representations from orthography, either rule based systems, pronunciation dictionaries, or automatic orthography-pronunciation conversion procedures trained on such pronunciation dictionaries may be employed.

Pronunciation lexicons, and therefore automatic procedures trained on pronunciation lexicons, employ lexical pronunciations. Lexical pronunciations are underspecified, generalized pronunciations that may or may not result in modified postlexical pronunciations in natural speech. For example, the English word foot might be listed in a pronunciation dictionary as /fuht/. Pronunciations are given using TIMIT (Texas Instruments-Massachusetts Institute of Technology) notation, described in Garofolo, John S., "The Structure and Format of the DARPA TIMIT CD-ROM Prototype". In natural speech, the final /t/ might surface either as [t], for example when foot ends a sentence, or as a flap, [dx], when foot comes before another word that starts with a vowel in the same sentence, as in "my foot is . . . "

Adding postlexical pronunciations to dictionaries instead of lexical pronunciations is not a viable solution to this problem for two reasons. The first reason is that pronunciation dictionaries would dramatically expand in size. The second reason is that pronunciation dictionaries are used to determine the pronunciations for words in isolation, while postlexical phenomena are encountered across words in sentences. So, at the time when a lexicon is consulted, there may or may not be sufficient information available to determine the appropriate postlexical pronunciation.

In neural network and other data-driven forms of speech synthesis, a learning procedure is employed to learn to generate speech spectral information from phonetic information. This constitutes the acoustic parameter neural network training. This is performed by labeling speech waveforms with phonetic information and then training, for example, a neural network or other data-driven system to learn the spectral characteristics associated with the time slices labeled with particular phones.

When such a neural network system is actually used, the neural network must produce appropriate spectral information for given phonetic information. As mentioned above, such phonetic information is derived from text by means of an orthography-phonetics lexicon or an automatic procedure trained on such a lexicon.

Since the object of data-driven speech synthesis methods is to produce testing data that is analogous to the training data, and thus similar to natural speech, it is important that the phonetic representations developed in the testing phase substantially match those that were used in the training phase. This will assure that the most reliable performance is obtained.

Unfortunately there is always likely to be some mismatch between the lexical pronunciations found in dictionaries and the pronunciations used to label speech. This mismatch may stem from at least four different sources: speaker idiosyncrasies, dictionary idiosyncrasies, labeler idiosyncrasies, and differences between lexical and postlexical pronunciations.

While rule-based approaches to generating postlexical pronunciations from lexical pronunciations might be successful for a given language, rule-based approaches will not be able to automatically deal with dictionary and labeler idiosyncrasies at the same time. That is, a new rule set would need to be developed for each possible combination of speaker, labeler and dictionary, resulting in an unwieldy situation.

Hence, there is a need for an automatic procedure for generating postlexical pronunciations from lexical pronunciations, both to increase the naturalness of synthetic speech, and to reduce the cost and time required to develop high quality speech synthesis systems. A method, device and article of manufacture for neural-network based generation of postlexical pronunciations from lexical pronunciations is needed.

BRIEF DESCRIPTION OF THE DRAWINGS

FIG. 11 is a schematic representation of the encoding of Stream 3 of FIG. 15 for training and testing the lexical-postlexical neural network in accordance with the present invention.

FIG. 18 is a schematic representation of the calculation of the Euclidean error measure as is known in the art.

FIG. 19 is a schematic representation of the calculation of the feature-based error measure in accordance with the present invention.

FIG. 20 is a flowchart of one embodiment of steps for determining lexical information from text and generating a postlexical pronunciation in accordance with the present invention.

DETAILED DESCRIPTION OF A PREFERRED EMBODIMENT

Figure 1:
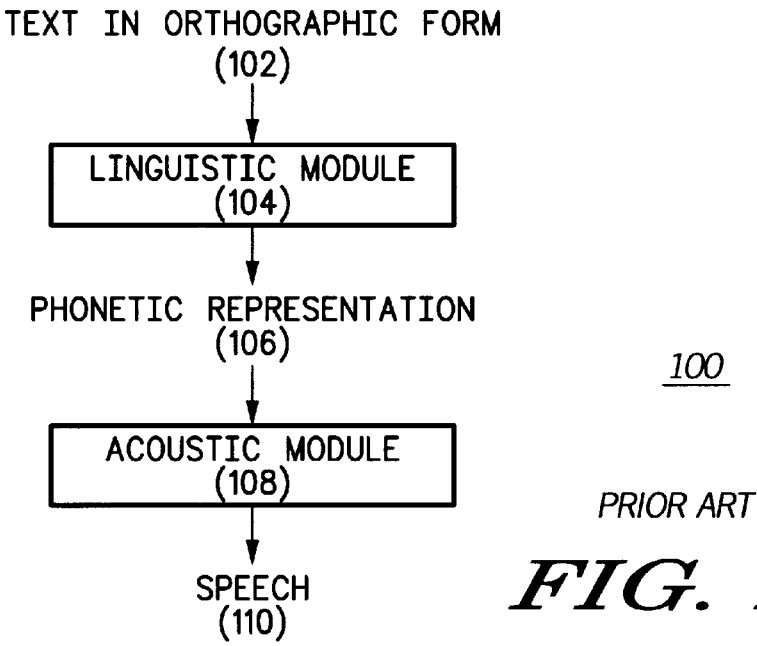
FIG. 1 is a schematic representation of the transformation of text to speech as is known in the art.
Figure 2:
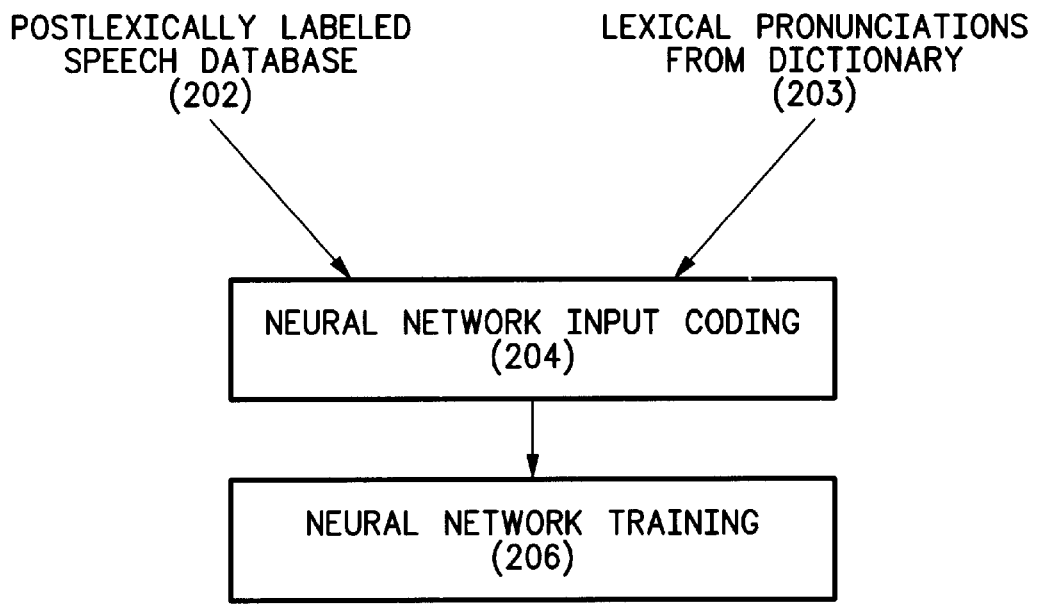
FIG. 2 is a schematic representation of one embodiment of the neural network training process used in the training of the lexical-postlexical converter in accordance with the present invention.

The present invention provides a method, device and article of manufacture for automatically converting lexical pronunciations into postlexical pronunciations by means of a neural network trained on a speech database labeled at the postlexical level paired with the lexical pronunciations of the words as derived from a pronunciation dictionary. The training results in a neural network with weights that represent the transfer functions required to produce postlexical pronunciations from lexical pronunciations. FIG. 2, numeral 200, provides a high-level view of the neural network training process, while FIG. 3, numeral 300, shows where the trained neural network lexical-postlexical converter, numeral 312, fits into the linguistic module of a speech synthesizer in a preferred embodiment. The method, device and article of manufacture for neural-network based generation of postlexical pronunciations from lexical pronunciations allows for text-to-speech systems to generate more natural speech than would otherwise be possible. In addition, the neural-network based generation of postlexical pronunciations from lexical pronunciations offers a financial advantage over the prior art in that the system is automatically trainable and can be adapted to any language with ease.

Table 1 shows the TIMIT phones that are used in lexical pronunciations, along with representative orthographic words illustrating the phones' sounds.

TABLE 1

| Number | TIMIT phone | sample word | Number | TIMIT phone | sample word |
|---|---|---|---|---|---|
| 0 | p | pop | 21 | aa | father |
| 1 | t | tot | 22 | uw | loop |
| 2 | k | kick | 23 | er | bird |
| 3 | m | mom | 24 | ay | high |
| 4 | n | non | 25 | ey | bay |
| 5 | ng | sing | 26 | aw | out |
| 6 | s | set | 27 | ax | sofa |
| 7 | z | zoo | 28 | b | barn |
| 8 | ch | chop | 29 | d | dog |
| 9 | th | thin | 30 | g | go |
| 10 | f | ford | 31 | sh | shoe |
| 11 | l | long | 32 | zh | garage |
| 12 | r | rod | 33 | dh | this |
| 13 | y | young | 34 | v | vice |
| 14 | hh | heavy | 35 | w | walk |
| 15 | eh | bed | 36 | ih | gift |
| 16 | ao | saw | 37 | ae | fast |
| 17 | ah | rust | 38 | uh | book |
| 18 | oy | boy | 39 | iy | bee |
| 19 | ow | low | 40 | el | bottle |
| 20 | en | button | 41 | em | bottom |

The letters in the orthographies that account for the particular TIMIT phones are shown in bold. Lexical pronunciations are enclosed in slashes, //. Table 2 shows the TIMIT phones that are used in postlexical pronunciations. Postlexical pronunciations are enclosed in brackets, [ ].

TABLE 2

| Number | TIMIT phone | Number | TIMIT phone |
|---|---|---|---|
| 1 | p | 29 | uw |
| 2 | pcl | 30 | dx |
| 3 | t | 31 | er |
| 4 | tcl | 32 | nx |
| 5 | k | 33 | ay |
| 6 | kcl | 34 | ey |
| 7 | m | 35 | aw |
| 8 | n | 36 | ax |
| 9 | ng | 37 | b |
| 10 | s | 38 | bcl |
| 11 | z | 39 | d |
| 12 | ch | 40 | dcl |
| 13 | th | 41 | g |
| 14 | f | 42 | gcl |
| 15 | l | 43 | sh |
| 16 | r | 44 | zh |
| 17 | y | 45 | dh |
| 18 | hh | 46 | v |
| 19 | eh | 47 | w |
| 20 | ao | 48 | ih |

TABLE 2-continued

| Number | TIMIT phone | Number | TIMIT phone |
|---|---|---|---|
| 21 | ah | 49 | ae |
| 22 | oy | 50 | uh |
| 23 | ow | 51 | iy |
| 24 | en | 52 | el |
| 25 | aa | 53 | axr |
| 26 | q | 54 | ix |
| 27 | ax-h | 55 | ux |
| 28 | hv | | |

Note that the meaning of a symbol may be different, depending on whether it is interpreted as a lexical or a postlexical phone. For example, on the postlexical level, [t] refers to a t release, while on the lexical level, /t/ can refer to a closure and release.

Figure 4:
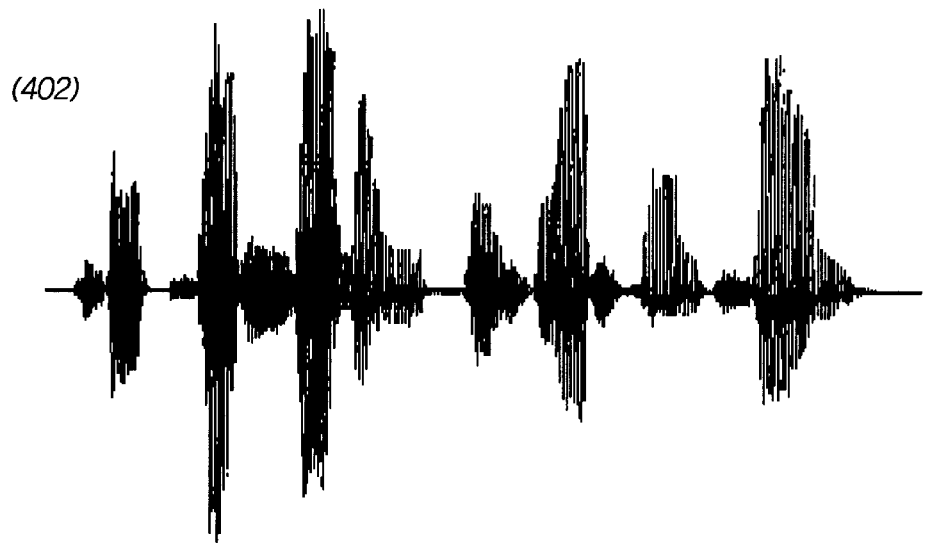
FIG. 4 is a schematic representation of a postlexically labeled speech database in accordance with the present invention.

In order to train a neural network to learn lexical-postlexical mapping, a postlexically labeled speech database, numeral 202 in FIG. 2, is obtained. FIG. 4, numeral 400, displays an excerpt from such a postlexically labeled speech database.

In order to create the labeled speech database, typically several hundred sentences of American English speech of one individual are recorded. The recordings attempt to elicit production of most phone combinations that occur in English. The recordings are digitized and displayed using speech analysis software. FIG. 4 shows a waveform (402) that results from the digitization and analysis of a short excerpt from the speech database. The speech is annotated by means of a three-tiered labeling system On the first tier, the orthographic tier (406), the speech is segmented into word-sized units, where the ends of each word are associated with a particular time in the course of the utterance. Each word-end is associated with an orthographic transcription of the word. On the second tier, the phone tier (408), the speech is segmented into phone-sized units, where ends of each phone are associated with a particular time in the course of the utterance. Each phone-end is associated with a transcription of the phone, using TIMIT postlexical phones shown in Table 2. On the third tier, the boundary tier (410), ends of syllables, words, phrases, clauses and sentences are associated with particular times in the course of the utterance. Each such boundary is listed with one of the boundary symbols shown in Table 3.

TABLE 3

| Boundary | Symbol |
|---|---|
| syllable | ]- |
| word | ]w |
| phrase | ]p |
| clause | ]c |
| sentence | ]s |

In order to determine the lexical pronunciations associated with the orthographic words located in (406) in the first labeled tier of the speech database, an orthography-lexical pronunciation dictionary is used. Table 4 displays an excerpt from an orthography-lexical pronunciation dictionary.

TABLE 4

| Orthography | Phonetics |
|---|---|
| the | dhiy |
| whale | hhweyl |
| cut | kaht |
| away | ax-wey |

The dictionary stores pairs of orthographies with their associated pronunciations. In the dictionary, pronunciations are described using TIMIT phones for lexical pronunciations, shown in Table 1.

In order to associate the postlexical pronunciations in the labeled speech database (FIG. 4), with the lexical pronunciations in the dictionary database (Table 4), a database join was effected between the two databases, with the orthographic representation of the words serving as the join field, since both databases contained orthographic information. The result of the join operation is a table containing orthographic, lexical and postlexical information for all the words in the recorded database. This information is organized as shown in Table 5, which intercalates phone and boundary information, while maintaining the order in which the words were uttered in the database.

TABLE 5

| Orthography | Lexical pronunciation | Postlexical pronunciation |
|---|---|---|
| the | dhiy | dhax |
| whale | hhweyl | weyl |
| cut | kaht | kahdx |
| away | axwey | axwey |

Boundary information, from the third tier of the labeled speech database, is listed identically across orthography, lexical and postlexical pronunciations, as shown in Table 5.

The neural network is trained on a numerically-encoded form of the joined orthography, lexical, postlexical database shown in Table 5.

The input coding for training consists of the following components: alignment of lexical and postlexical phones, extraction of lexical phone features, extraction of boundary distance information, extraction of boundary adjacency information, conversion of the input phones to numbers, and loading the input into a sliding window. The input coding for training requires the generation of five streams of input to the neural network simulator. Stream 1 contains postlexical phones including any alignment separators, Stream 2 contains lexical phones, Stream 3 contains the features associated with lexical phones, Stream 4 contains boundary distance information, and Stream 5 contains boundary adjacency information.

Alignment of phones is necessary to provide the neural network with a reasonable sense of which lexical phones correspond to which postlexical phones. Alignment of phones means to explicitly associate particular lexical phones with particular postlexical phones in a series of locations.

Figures 5, 6, 7, 8:
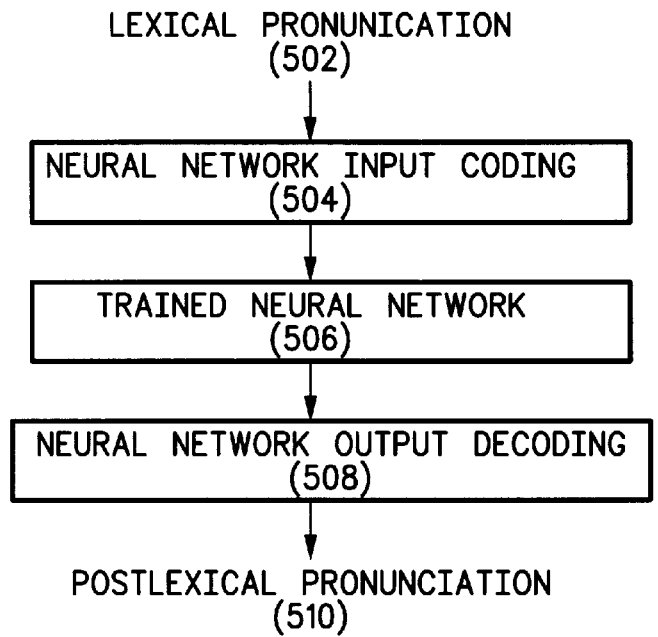
FIG. 5 is a schematic representation of one embodiment of the operation of the neural network lexical-postlexical converter in accordance with the present invention.
FIG. 6 is a schematic representation of the alignment of a lexical pronunciation and a postlexical pronunciation where the number of phones in the lexical pronunciation is the same as the number of phones in the postlexical pronunciation in accordance with the present invention.
FIG. 7 is a schematic representation of the alignment of a lexical pronunciation and a postlexical pronunciation where the number of phones in the lexical pronunciation is greater than the number of phones in the postlexical pronunciation in accordance with the present invention.
FIG. 8 is a schematic representation of the alignment of a lexical pronunciation and a postlexical pronunciation where the postlexical pronunciation employs a collapsed phone in accordance with the present invention.

FIG. 6, numeral 600, illustrates the alignment of lexical and postlexical phones in a word where the number of lexical and postlexical phones is the same.

FIG. 7, numeral 700, illustrates the alignment of lexical and postlexical phones in a word where the number of lexical phones exceeds the number of postlexical phones. In this case, when this token of the word and was uttered, the final /d/ was dropped. This deletion is marked on the postlexical tier by the presence of an alignment separator, '+', opposite the /d/ on the lexical tier.

Since the postlexical phones are the final output of the lexical-postlexical conversion process, alignment separators are deleted prior to output. Alignment separators are not permitted on the lexical phone tier. The reason for this is that during operation of the lexical-postlexical converter, alignment separators would need to be inserted into input lexical phones, however there would be no principled way to do this.

Often, postlexical pronunciations contain fewer phones than lexical pronunciations. This is due to the fact that deletion and reduction are common postlexical phenomena across languages, and such phenomena can be described through the removal of phones from transcriptions. In these cases, alignment separators can be inserted into the postlexical transcription where the lexical phones would have been had they not been deleted.

In some cases, postlexical transcriptions use more phones than do the corresponding lexical transcriptions. This is because postlexical transcriptions include more detail. For example, postlexical transcriptions include closure and release information for stops, a level of detail which is not specified in lexical transcriptions.

FIG. 8, numeral 800, is an example of the alignment of a postlexical pronunciation with more phones than its associated lexical pronunciation. The problem is solved by collapsing certain combinations of postlexical phones to a single symbol. In FIG. 8, the postlexical combination, bcl+b, is replaced by a collapsed phone, B.

Table 6 shows the postlexical combinations and the collapsed symbols with which they are replaced for alignment and input encoding.

TABLE 6

| postlexical phone combination | collapsed postlexical phone |
|---|---|
| q + aa | AA |
| q + ae | AE |
| q + ah | AH |
| q + ao | AO |
| q + aw | AW |
| q + ax | AX |
| q + axr | AXR |
| q + ix | IX |
| q + iy | IY |
| q + ih | IH |
| q + ax-h | AX-H |

TABLE 6-continued

| postlexical phone combination | collapsed postlexical phone |
|---|---|
| q + ay | AY |
| q + eh | EH |
| q + el | EL |
| q + em | EM |
| q + er | ER |
| q + ey | EY |
| q + ow | OW |
| q + oy | OY |
| q + uh | UH |
| q + uw | UW |
| q + ux | UX |
| bcl + b | B |
| dcl + d | D |
| gcl + g | G |
| pcl + p | P |
| tcl + t | T |
| kcl + k | K |
| dcl + jh | JH |
| tcl + ch | CH |

The collapsed phones capture the fact that the postlexical phones that are collapsed are associated with just one lexical phone, allowing the neural network to make better choices for each phone slot.

A new variation to the dynamic programming algorithm that is known in the art was employed to align lexical and postlexical pronunciations. The version of dynamic programming known in the art has been described with respect to aligning words that use the same alphabet. Costs are applied for insertion, deletion and substitution of characters. Substitutions have no cost only when the same character is in the same location in each sequence.

In order to align sequences from different alphabets, such as the postlexical phones and the lexical phones, a new method was devised for calculating substitution costs.

Note that the lexical phone and postlexical phone symbol sets, shown in Table 1 and Table 2, are not greatly different, but in addition to a few symbols that are exclusive to one or the other symbol set, the meanings of some of the symbols is actually different between the two alphabets. For example, the lexical phone /b/ can indicate a /b/ that is articulated with or without a release, whereas the postlexical phone [b] indicates the b release only.

A customized table reflecting the likelihood that each lexical phone would be aligned opposite each postlexical phone was designed. Table 7 illustrates the lexical-postlexical phone cost table for American English.

TABLE 7

| Lexical Phone | Postlexical Phone | Cost | Lexical Phone | Postlexical Phone | Cost | Lexical Phone | Postlexical Phone | Cost |
|---|---|---|---|---|---|---|---|---|
| aa | aa | 0 | ih | IX | 0 | er | ER | 0 |
| aa | AA | 0 | ih | ax | .3 | ey | ey | 0 |
| ae | ae | 0 | ih | AX | .3 | f | f | 0 |
| ae | AE | 0 | iy | iy | 0 | g | g | 0 |
| ah | ah | 0 | iy | IY | 0 | g | gcl | 0 |
| ah | AH | 0 | jh | jh | 0 | g | G | 0 |
| ao | ao | 0 | jh | JH | 0 | hh | hh | 0 |
| ao | AO | 0 | k | k | 0 | y | y | 0 |
| aw | aw | 0 | k | kcl | 0 | zh | zh | 0 |
| aw | AW | 0 | k | K | 0 | z | z | 0 |
| ax | ax | 0 | l | l | 0 | hh | hv | 0 |
| ax | AX | 0 | l | el | .3 | ih | ih | 0 |
| ax | ix | .3 | m | m | 0 | ih | IH | 0 |

TABLE 7-continued

| Lexical Phone | Postlexical Phone | Cost | Lexical Phone | Postlexical Phone | Cost | Lexical Phone | Postlexical Phone | Cost |
|---|---|---|---|---|---|---|---|---|
| ax | IX | .3 | ng | ng | 0 | | | |
| ax | ih | .3 | n | n | 0 | | | |
| ax | IH | .3 | n | nx | 0 | | | |
| ax | ax-h | 0 | ow | ow | 0 | | | |
| ay | ay | 0 | ow | OW | 0 | | | |
| ay | AY | 0 | oy | oy | 0 | | | |
| b | b | 0 | p | p | 0 | | | |
| b | B | 0 | p | pcl | 0 | | | |
| b | bcl | 0 | p | P | 0 | | | |
| ch | ch | 0 | r | axr | .5 | | | |
| ch | CH | 0 | r | er | .5 | | | |
| dh | dh | 0 | sh | sh | 0 | | | |
| d | d | 0 | s | s | 0 | | | |
| d | dcl | 0 | th | th | 0 | | | |
| d | D | 0 | t | t | 0 | | | |
| eh | eh | 0 | t | q | 0 | | | |
| eh | EH | 0 | t | tcl | 0 | | | |
| el | el | 0 | t | T | 0 | | | |
| el | EL | 0 | uh | uh | 0 | | | |
| em | em | 0 | uh | UH | 0 | | | |
| em | EM | 0 | uw | uw | 0 | | | |
| en | en | 0 | uw | UW | 0 | | | |
| en | EN | 0 | uw | ux | 0 | | | |
| er | er | 0 | v | v | 0 | | | |
| er | axr | 0 | w | w | 0 | | | |

While some of these costs reflect relationships that hold across languages, others reflect postlexical processes particular to American English. For substitutions other than those covered in the table in Table 7, and insertions and deletions, the costs used in the art of speech recognition scoring are employed: insertion costs 3, deletion costs 3, and substitution costs 4.

With respect to Table 7, the cost for allowing a particular correspondence should be less than the fixed cost for insertion or deletion, in other cases greater. The more likely it is that a given phone and letter could correspond in a particular location, the lower the cost for substituting the phone and letter.

Figure 10:
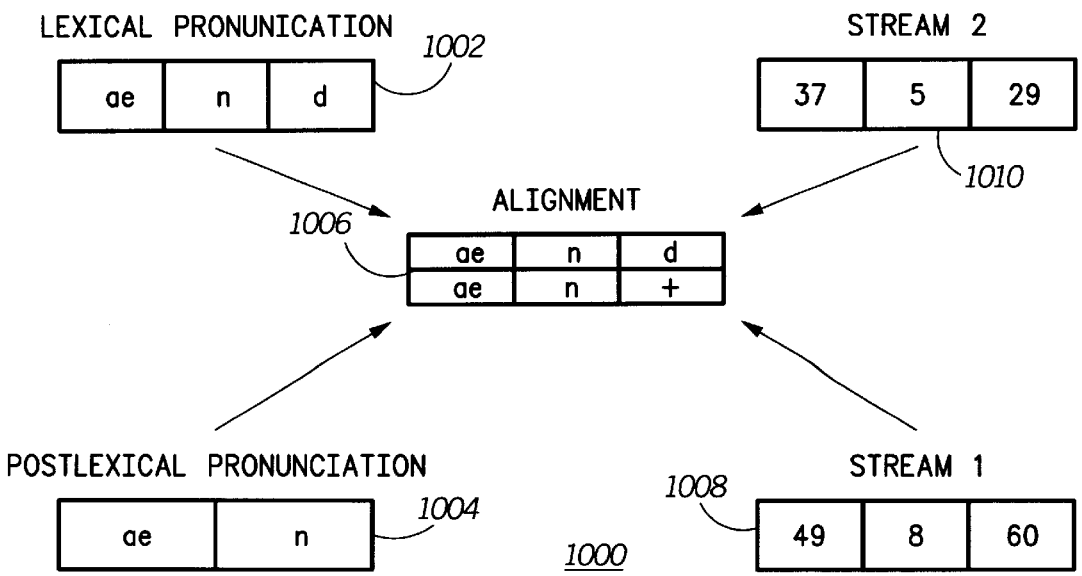
FIG. 10 is a schematic representation of the encoding of Stream 1 of FIG. 15 and Stream 2 of FIG. 15 for training the lexical-postlexical neural network in accordance with the present invention.

FIG. 10, numeral 1000, illustrates the coding of Streams 1 (1008) and 2 (1010) of the neural network input encoding for training. An input lexical pronunciation (1002), /aend/, and an input postlexical pronunciation (1004), [aen], are submitted to an alignment procedure.

The alignment procedure inserts an alignment separator, '+', into the postlexical pronunciation, resulting in (1006) [aen+]. The numeric code for '+' is 60. The postlexical pronunciation with alignment separators (1006) is converted to numbers by consulting Table 2 and loaded into a storage buffer for Stream 1 (1008). The lexical pronunciation is converted to numbers by consulting Table 1 and loaded into a storage buffer for Stream 2 (1010).

FIG. 11, numeral 1100, illustrates the coding of Stream 3 of the neural network input encoding for training. Each phone of the lexical pronunciation is associated with its acoustic and articulatory features.

In order to give the neural network further information upon which to generalize beyond the training set, acoustic and articulatory features for each phone are provided in the input coding. Acoustic and articulatory features for phonological segments is a common concept in the art. That is, each phone can be described by several phonetic features. Table 8 shows the features associated with each lexical phone that is used in this embodiment. For each phone, a feature can either be activated '+', not activated, '−', or unspecified '0'.

TABLE 8

| Phoneme | Phoneme Number | Vicalic | Vowel | Sonorant | Obstruent | Flap | Continuant | Affricate | Nasal | Approximant | Click | Trill | Silence |
|---|---|---|---|---|---|---|---|---|---|---|---|---|---|
| ax | 1 | + | + | + | − | − | + | − | − | − | − | − | − |
| axr | 2 | + | + | + | − | − | + | − | − | − | − | − | − |
| er | 3 | + | + | + | − | − | + | − | − | − | − | − | − |
| r | 4 | − | − | + | − | − | + | − | − | + | − | − | − |
| ao | 5 | + | + | + | − | − | + | − | − | − | − | − | − |
| ae | 6 | + | + | + | − | + | − | − | − | − | − | − | + |
| aa | 7 | + | + | + | − | + | − | − | − | − | − | − | − |
| dh | 8 | − | − | − | + | − | + | − | − | − | − | − | − |
| eh | 9 | + | + | + | − | + | − | − | − | − | − | + | + |
| ih | 10 | + | + | + | − | + | − | − | − | + | + | − | − |
| ng | 11 | − | − | + | + | − | − | − | + | − | − | − | − |
| sh | 12 | − | − | − | + | + | − | − | + | − | − | − | − |
| th | 13 | − | − | − | + | + | − | − | + | − | − | − | − |
| uh | 14 | + | + | + | − | − | + | − | − | ' | − | − | − |
| zh | 15 | − | − | − | + | − | + | − | − | − | − | − | − |
| ah | 16 | + | + | + | − | − | + | − | − | ' | − | − | − |

TABLE 8-continued

| | | | | | | | | | | | | |
|---|---|---|---|---|---|---|---|---|---|---|---|---|
| ay | 17 | + | + | + | − | − | + | − | − | , | − | − | − |
| aw | 18 | + | + | + | − | − | + | − | − | , | − | − | − |
| b | 19 | − | − | − | + | + | − | − | + | − | − | − | − |
| dx | 20 | − | − | + | + | − | − | − | − | − | − | − | − |
| d | 21 | − | − | + | − | − | − | − | − | − | − | − | − |
| ih | 22 | − | − | + | − | + | + | − | + | − | − | − | − |
| ey | 23 | + | + | + | − | − | + | − | − | − | − | − | − |
| f | 24 | − | − | + | − | + | − | − | + | − | − | − | − |
| g | 25 | − | − | − | + | − | − | − | − | − | − | − | − |
| hh | 26 | − | − | + | − | + | − | − | − | − | − | − | − |
| iy | 27 | + | + | + | − | − | + | − | − | − | − | − | + |
| y | 28 | + | − | + | − | − | + | − | − | + | − | − | − |
| k | 29 | − | − | + | − | − | − | − | − | − | − | − | − |
| l | 30 | − | + | − | − | + | − | − | + | − | − | − | − |
| el | 31 | + | − | + | − | − | − | − | + | − | − | − | − |
| m | 32 | − | − | + | + | − | − | − | + | − | − | − | − |
| n | 33 | − | − | + | + | − | − | − | + | − | − | − | − |
| en | 34 | + | − | + | + | − | − | − | + | − | − | − | − |
| ow | 35 | + | + | + | − | − | + | − | − | − | − | − | + |
| oy | 36 | + | + | + | − | − | + | − | − | − | − | − | + |
| p | 37 | − | − | − | + | + | − | − | + | − | − | − | − |
| s | 38 | − | − | − | + | − | − | − | + | − | − | − | − |
| f | 39 | − | − | − | + | − | − | − | − | − | − | − | − |
| ch | 40 | − | − | − | + | − | − | − | − | − | − | − | − |
| uw | 41 | + | + | + | − | − | + | − | − | − | − | − | + |
| x | 42 | − | − | − | + | − | + | − | − | − | − | − | − |
| w | 43 | + | − | + | − | − | + | − | + | − | − | − | − |
| z | 44 | − | − | − | + | − | + | − | − | − | − | − | − |

| Phoneme | Front 1 | Front 2 | Mid Front 1 | Mid Front 2 | Mid 1 | Mid 2 | Back 1 | Back 2 | High 1 | High 2 | Mid High 1 | Mid High 2 | Mid Low 1 | Mid Low 2 | |
|---|---|---|---|---|---|---|---|---|---|---|---|---|---|---|---|
| ax | − | − | − | − | + | + | − | − | − | − | − | − | + | + | − |
| axr | − | − | − | − | + | + | − | − | − | − | − | − | + | + | − |
| er | − | − | − | − | + | + | − | − | − | − | − | − | + | + | − |
| r | 0 | 0 | 0 | 0 | 0 | 0 | 0 | 0 | 0 | 0 | 0 | 0 | 0 | 0 | 0 |
| ao | − | − | − | − | − | + | − | − | − | − | + | + | − | − | 0 |
| ae | + | − | − | − | − | − | − | − | − | − | − | − | − | + | + |
| aa | − | − | − | − | − | − | − | − | − | − | − | − | − | + | + |
| dh | 0 | 0 | 0 | 0 | 0 | 0 | 0 | 0 | 0 | 0 | 0 | 0 | 0 | 0 | 0 |
| eh | − | − | − | − | − | − | − | − | − | − | + | + | − | − | 0 |
| ih | − | − | − | − | − | − | − | − | − | − | − | − | + | + | 0 |
| ng | 0 | 0 | 0 | 0 | 0 | 0 | 0 | 0 | 0 | 0 | 0 | 0 | 0 | 0 | 0 |
| sh | 0 | 0 | 0 | 0 | 0 | 0 | 0 | 0 | 0 | 0 | 0 | 0 | 0 | 0 | 0 |
| th | 0 | 0 | 0 | 0 | 0 | 0 | 0 | 0 | 0 | 0 | 0 | 0 | 0 | 0 | 0 |
| uh | − | − | − | − | − | − | + | + | − | − | + | + | − | − | − |
| zh | 0 | 0 | 0 | 0 | 0 | 0 | 0 | 0 | 0 | 0 | 0 | − | − | − | − |
| ah | − | − | − | − | − | − | + | + | − | − | + | + | − | − | − |
| ay | − | , | − | − | − | , | + | + | − | − | + | + | − | − | − |
| aw | − | , | − | − | − | , | + | + | − | − | + | + | − | − | − |
| b | 0 | 0 | 0 | 0 | 0 | 0 | 0 | 0 | 0 | 0 | 0 | 0 | 0 | 0 | 0 |
| dx | 0 | 0 | 0 | 0 | 0 | 0 | 0 | 0 | 0 | 0 | 0 | 0 | 0 | 0 | 0 |
| d | 0 | 0 | 0 | 0 | 0 | 0 | 0 | 0 | 0 | 0 | 0 | 0 | 0 | 0 | 0 |
| ih | 0 | 0 | 0 | 0 | 0 | 0 | 0 | 0 | 0 | 0 | 0 | 0 | 0 | 0 | 0 |
| ey | + | + | − | − | − | − | − | − | − | + | + | − | − | − | − |
| f | 0 | 0 | 0 | 0 | 0 | 0 | 0 | 0 | 0 | 0 | 0 | 0 | 0 | 0 | 0 |
| g | 0 | 0 | 0 | 0 | 0 | 0 | 0 | 0 | 0 | 0 | 0 | 0 | 0 | 0 | 0 |
| hh | 0 | 0 | 0 | 0 | 0 | 0 | 0 | 0 | 0 | 0 | 0 | 0 | 0 | 0 | 0 |
| iy | + | − | − | − | − | − | − | − | + | + | − | − | − | − | − |
| y | 0 | 0 | 0 | 0 | 0 | 0 | 0 | 0 | 0 | 0 | 0 | 0 | 0 | 0 | 0 |
| k | 0 | 0 | 0 | 0 | 0 | 0 | 0 | 0 | 0 | 0 | 0 | 0 | 0 | 0 | 0 |
| l | 0 | 0 | 0 | 0 | 0 | 0 | 0 | 0 | 0 | 0 | 0 | 0 | 0 | 0 | 0 |
| el | 0 | 0 | 0 | 0 | 0 | 0 | 0 | 0 | 0 | 0 | 0 | 0 | 0 | 0 | 0 |
| m | 0 | 0 | 0 | 0 | 0 | 0 | 0 | 0 | 0 | 0 | 0 | 0 | 0 | 0 | 0 |
| n | 0 | 0 | 0 | 0 | 0 | 0 | 0 | 0 | 0 | 0 | 0 | 0 | 0 | 0 | 0 |
| en | 0 | 0 | 0 | 0 | 0 | 0 | 0 | 0 | 0 | 0 | 0 | 0 | 0 | 0 | 0 |
| ow | + | − | − | − | − | + | + | − | − | + | + | − | − | − | − |
| oy | − | − | + | + | − | − | − | − | − | − | − | − | − | − | − |
| p | 0 | 0 | 0 | 0 | 0 | 0 | 0 | 0 | 0 | 0 | 0 | 0 | 0 | 0 | 0 |
| s | 0 | 0 | 0 | 0 | 0 | 0 | 0 | 0 | 0 | 0 | 0 | 0 | 0 | 0 | 0 |
| t | 0 | 0 | 0 | 0 | 0 | 0 | 0 | 0 | 0 | 0 | 0 | 0 | 0 | 0 | 0 |
| ch | 0 | 0 | 0 | 0 | 0 | 0 | 0 | 0 | 0 | 0 | 0 | 0 | 0 | 0 | 0 |
| uw | − | − | − | − | − | − | + | + | + | + | − | − | − | − | − |
| x | 0 | 0 | 0 | 0 | 0 | 0 | 0 | 0 | 0 | 0 | 0 | 0 | 0 | 0 | 0 |
| w | 0 | 0 | 0 | 0 | 0 | 0 | 0 | 0 | 0 | 0 | 0 | 0 | 0 | 0 | 0 |
| z | 0 | 0 | 0 | 0 | 0 | 0 | 0 | 0 | 0 | 0 | 0 | 0 | 0 | 0 | 0 |

TABLE 8-continued

| Phoneme | Low 1 | Low 2 | Bilao-ant | Labio-dental | Dental | Alveolar | Post-Alveolar | Retro-flex | Palatal | Velar | Uvular | Pharyngeal | Giottal |
|---|---|---|---|---|---|---|---|---|---|---|---|---|---|
| ax | − | 0 | 0 | 0 | 0 | 0 | − | 0 | 0 | 0 | 0 | 0 | 0 |
| axr | − | 0 | 0 | 0 | 0 | 0 | − | 0 | 0 | 0 | 0 | 0 | 0 |
| er | − | 0 | 0 | 0 | 0 | 0 | − | 0 | 0 | 0 | 0 | 0 | 0 |
| r | − | − | − | + | + | + | − | − | − | − | − | − | − |
| ao | 0 | 0 | 0 | 0 | − | 0 | 0 | 0 | 0 | 0 | 0 | − | − |
| ae | 0 | 0 | 0 | 0 | 0 | − | 0 | 0 | 0 | 0 | 0 | 0 | − |
| aa | 0 | 0 | 0 | 0 | 0 | − | 0 | 0 | 0 | 0 | 0 | 0 | − |
| dh | 0 | − | − | + | − | − | − | − | − | − | − | − | − |
| eh | 0 | 0 | 0 | 0 | 0 | − | 0 | 0 | 0 | 0 | 0 | − | − |
| ih | 0 | 0 | 0 | 0 | 0 | − | 0 | 0 | 0 | 0 | 0 | − | − |
| ng | 0 | − | − | − | − | − | − | − | + | − | − | − | − |
| sh | 0 | − | − | − | − | + | − | − | + | − | − | − | − |
| th | 0 | − | − | + | − | − | − | − | + | − | − | − | − |
| uh | − | 0 | 0 | 0 | 0 | 0 | − | 0 | 0 | 0 | 0 | 0 | 0 |
| zh | + | − | − | − | − | − | − | − | − | − | − | − | − |
| ah | − | 0 | 0 | 0 | 0 | 0 | − | 0 | 0 | 0 | 0 | 0 | 0 |
| ay | 0 | 0 | 0 | 0 | 0 | − | 0 | 0 | 0 | 0 | 0 | 0 | − |
| aw | 0 | 0 | 0 | 0 | − | 0 | 0 | 0 | 0 | 0 | 0 | − | − |
| b | 0 | + | − | − | − | − | − | − | + | − | − | − | − |
| dx | 0 | − | − | − | + | − | − | − | + | − | − | − | − |
| d | 0 | − | − | − | + | − | − | − | + | − | − | − | − |
| ih | 0 | − | − | − | − | + | − | − | + | − | − | − | − |
| ey | − | 0 | 0 | 0 | 0 | 0 | − | 0 | 0 | 0 | 0 | 0 | 0 |
| f | 0 | − | + | − | − | − | − | − | − | − | − | − | − |
| g | 0 | − | − | − | − | − | − | − | + | − | − | − | − |
| hh | 0 | − | − | − | − | − | − | − | − | − | − | + | − |
| iy | 0 | 0 | 0 | 0 | 0 | − | 0 | 0 | 0 | 0 | 0 | 0 | − |
| y | 0 | − | − | − | − | − | − | + | − | − | − | − | − |
| k | 0 | − | − | − | − | − | − | − | + | − | − | − | − |
| l | 0 | − | − | − | + | − | − | − | + | − | − | − | − |
| el | 0 | − | − | − | + | − | − | − | + | − | − | − | − |
| m | 0 | + | − | + | − | − | − | − | + | − | − | − | − |
| n | 0 | − | − | − | + | − | − | − | + | − | − | − | − |
| en | 0 | − | − | − | + | − | − | − | + | − | − | − | − |
| ow | 0 | 0 | 0 | 0 | 0 | − | 0 | 0 | 0 | 0 | 0 | 0 | − |
| oy | 0 | 0 | 0 | 0 | 0 | − | 0 | 0 | 0 | 0 | 0 | 0 | − |
| p | 0 | − | − | + | − | − | − | − | + | − | − | − | − |
| s | 0 | + | − | − | + | − | − | − | + | − | − | − | − |
| f | 0 | − | − | − | + | − | − | − | − | − | − | + | − |
| ch | 0 | − | − | − | − | + | − | − | − | − | − | − | − |
| uw | 0 | 0 | 0 | 0 | 0 | − | 0 | 0 | 0 | 0 | 0 | 0 | − |
| x | 0 | − | + | + | − | − | − | − | + | − | − | − | − |
| w | 0 | + | − | − | − | − | − | − | + | − | − | − | − |
| z | 0 | − | − | − | + | − | − | − | − | − | − | − | − |

| Phoneme | Epigiottal | Hyper-Aspirated | aspirated | Closure | Ejective | Implosive | Lablialized | Nasalized | Rhotec | Voice | Round 1 | Round 2 | Long |
|---|---|---|---|---|---|---|---|---|---|---|---|---|---|
| ax | − | − | − | − | − | − | − | − | − | + | − | − | − |
| axr | − | − | − | − | − | − | − | − | + | + | − | − | − |
| er | − | − | − | − | − | − | − | − | + | + | − | − | − |
| r | − | − | − | − | − | − | − | + | + | 0 | 0 | 0 | |
| ao | − | + | + | + | − | | | | − | + | + | + | |
| ae | − | − | − | − | − | − | − | − | − | + | − | − | + |
| aa | − | − | − | − | − | − | − | − | − | + | − | − | + |
| dh | − | − | − | − | − | − | − | − | + | 0 | 0 | 0 | |
| eh | − | − | − | − | − | − | − | − | + | − | − | − | |
| ih | − | − | − | − | − | − | − | − | + | − | − | − | |
| ng | − | − | − | − | − | − | − | − | − | − | + | 0 | 0 |
| sh | − | − | − | − | − | − | − | − | − | − | − | 0 | 0 |
| th | − | − | − | − | − | − | − | − | − | − | − | 0 | 0 |
| uh | − | − | − | − | − | − | − | − | − | + | + | + | − |
| zh | − | − | + | 0 | 0 | 0 | | | | | | | |
| ah | − | − | − | − | − | − | − | − | − | + | + | + | − |
| ay | − | − | − | − | − | − | − | − | + | + | + | − | |
| aw | − | − | − | − | − | − | + | − | + | + | − | | |
| b | − | − | − | − | − | − | − | − | − | − | − | + | 0 | 0 |
| dx | − | − | − | − | − | − | − | − | − | − | − | + | 0 | 0 |
| d | − | − | − | − | − | − | − | − | − | − | − | + | 0 | 0 |
| ih | − | − | − | − | − | − | − | − | − | − | − | + | 0 | 0 |
| ey | − | − | − | − | − | − | − | − | − | + | − | − | + |
| f | − | − | − | − | − | − | − | − | − | − | − | + | 0 |
| g | − | − | − | − | − | − | − | − | − | − | − | + | 0 |
| hh | + | − | − | − | − | − | − | − | − | − | − | − | 0 | 0 |
| iy | − | − | − | − | − | − | − | − | − | + | − | − | + |
| y | − | − | − | − | − | − | − | − | − | − | + | 0 | 0 |

TABLE 8-continued

| | | | | | | | | | | | | | |
|---|---|---|---|---|---|---|---|---|---|---|---|---|---|
| k | − | − | − | − | − | − | − | − | − | − | 0 | 0 | 0 |
| l | − | − | − | − | − | − | + | − | − | + | 0 | 0 | 0 |
| el | − | − | − | − | − | − | + | − | − | + | 0 | 0 | 0 |
| m | − | − | − | − | − | − | + | − | − | + | 0 | 0 | 0 |
| n | − | − | − | − | − | − | − | − | − | + | 0 | 0 | 0 |
| en | − | − | − | − | − | − | − | − | − | + | 0 | 0 | 0 |
| ow | − | − | − | − | − | − | − | − | + | + | + | + | |
| oy | − | − | − | − | − | − | − | − | + | − | − | + | |
| p | − | − | − | − | − | − | − | − | − | − | 0 | 0 | 0 |
| s | − | − | − | − | − | − | − | − | − | − | 0 | 0 | 0 |
| f | − | − | − | − | − | − | − | − | − | − | 0 | 0 | 0 |
| ch | − | − | − | − | − | − | − | − | − | − | 0 | 0 | 0 |
| uw | − | − | − | − | − | − | − | − | + | + | + | − | |
| x | − | − | − | − | − | − | − | − | − | + | 0 | 0 | 0 |
| w | − | − | − | − | − | − | − | − | − | + | + | + | 0 |
| z | − | − | − | − | − | − | − | − | − | + | 0 | 0 | 0 |

In FIG. 11, each phone of /aend/, that is, /ae/ (1102), /n/ (1104), and /d/ (1106), is looked up in the feature table in Table 8. The activated features for each phone are listed in (1108), (1112), and (1116).

The features for each lexical phone are then converted to numbers by consulting the feature number table in Table 9. The numeric encodings then serve as Stream 3 for /ae/ (1110), /n/ (1114) and /d/ (1118).

TABLE 9

| Phone | Number |
|---|---|
| Vocalic | 1 |
| Vowel | 2 |
| Sonorant | 3 |
| Obstruent | 4 |
| Flap | 5 |
| Continuant | 6 |
| Affricate | 7 |
| Nasal | 8 |
| Approximant | 9 |
| Click | 10 |
| Trill | 11 |
| Silence | 12 |
| Front 1 | 13 |
| Front 2 | 14 |
| Mid front 1 | 15 |
| Mid front 2 | 16 |
| Mid 1 | 17 |
| Mid 2 | 18 |
| Back 1 | 19 |
| Back 2 | 20 |
| High 1 | 21 |
| High 2 | 22 |
| Mid high 1 | 23 |
| Mid high 2 | 24 |
| Mid low 1 | 25 |
| Mid low 2 | 26 |
| Low 1 | 27 |
| Low 2 | 28 |
| Bilabial | 29 |
| Labiodental | 30 |
| Dental | 31 |
| Alveolar | 32 |
| Post-alveolar | 33 |
| Retroflex | 34 |
| Palatal | 35 |

TABLE 9-continued

| Phone | Number |
|---|---|
| Velar | 36 |
| Uvular | 37 |
| Pharyngeal | 38 |
| Glottal | 39 |
| Epiglottal | 40 |
| Aspirated | 41 |
| Hyper-aspirated | 42 |
| Closure | 43 |
| Ejective | 44 |
| Implosive | 45 |
| Lablialized | 46 |
| Lateral | 47 |
| Nasalized | 48 |
| Rhotacized | 49 |
| Voiced | 50 |
| Round 1 | 51 |
| Round 2 | 52 |
| Long | 53 |

In order to provide the neural network with additional information upon which to base output postlexical phone hypotheses based on input lexical phones and input lexical phone features, a set of distances to various crucial boundaries is presented to the network.

Across languages, postlexical phenomena have been shown to be sensitive to syllable, word, phrase, clause and sentence boundaries. In order to provide the neural network with this kind of information, boundary information is provided for the following linguistic constructs, going from largest to smallest: sentence, clause, phrase, word and syllable. For each construct, the following information is provided: 1/(number of phones to start of construct), 1/(number of phones to end of construct), and 1/(length of construct in phones). Constructs serve as boundaries for themselves and all smaller constructs. That is, a sentence boundary serves as a clause, phrase, word and syllable boundary for the sake of the boundary distance measures. Table 10 shows the numeric input for Stream 4 for the lexical input /dhiy seyl kaht axwey/.

TABLE 10

| | dh | iy | s | ey | l | k | ah | t | ax | w | ey |
|---|---|---|---|---|---|---|---|---|---|---|---|
| 1/(phone distance to syllable start) | 1 | .5 | 1 | .5 | .33 | 1 | .5 | .33 | 1 | 1 | .5 |
| 1/(phone distance to syllable end) | .5 | 1 | .33 | .5 | 1 | .33 | .5 | 1 | 1 | .5 | 1 |

TABLE 10-continued

|  | dh | iy | s | ey | l | k | ah | t | ax | w | ey |
|---|---|---|---|---|---|---|---|---|---|---|---|
| 1/phone length of syllable | .5 | .5 | .33 | .33 | .33 | .33 | .33 | .33 | 1 | .5 | .5 |
| 1/(phone distance to word start) | 1 | .5 | 1 | .5 | .33 | 1 | .5 | .33 | 1 | .5 | .33 |
| 1/(phone distance to word end) | .5 | 1 | .33 | .5 | 1 | .33 | .5 | 1 | .3 | .5 | 1 |
| 1/(phone length of word) | .5 | .5 | .33 | .33 | .33 | .33 | .33 | .33 | .3 | .3 | .33 |
| 1/(phone distance to phrase start) | 1 | .5 | .33 | .25 | .2 | 1 | .5 | .33 | .25 | .2 | .17 |
| 1/(phone distance to phrase end) | .2 | .25 | .33 | .5 | 1 | .17 | .2 | .25 | .33 | .5 | 1 |
| 1/(phone length of phrase) | .2 | .2 | .2 | .2 | .2 | .17 | .17 | .17 | .17 | .17 | .17 |
| 1/(phone distance to clause start) | 1 | .5 | .33 | .25 | .2 | 1 | .5 | .33 | .25 | .2 | .17 |
| 1/(phone distance to clause end) | .2 | .25 | .33 | .5 | 1 | .17 | .2 | .25 | .33 | .5 | 1 |
| 1/(phone length of clause) | .2 | .2 | .2 | .2 | .2 | .17 | .17 | .17 | .17 | .17 | .17 |
| 1/(phone distance to sentence start) | 1 | .5 | .33 | .25 | .2 | .17 | .14 | .13 | .11 | .1 | .09 |
| 1/(phone distance to sentence end) | .09 | .1 | .1 | .13 | .14 | .17 | .2 | .25 | .33 | .5 | 1 |
| 1/(phone length of sentence) | .09 | .09 | .09 | .09 | .09 | .09 | .09 | .09 | .09 | .09 | .09 |

In order to provide the network with information regarding the adjacency to various boundaries, a set of boolean values, where 1=true and 0=false, are presented to the network. For each of syllables, words, phrase, clauses, and sentences, the following boolean values are provided to the network: whether the phone is adjacent to a boundary on the left, and whether the phone is adjacent to a boundary on the right. For a phone that is adjacent to a boundary on the left, all smaller constructs' boolean values for a left boundary are set to true. For a phone that is adjacent to a boundary on the right, all smaller constructs' boolean values for a right boundary are set to true. Table 11 shows the numeric input for Stream 5 for the lexical input: /dhiy seyl kaht axwey/.

TABLE 11

|  | dh | iy | s | ey | l | k | ah | t | ax | w | ey |
|---|---|---|---|---|---|---|---|---|---|---|---|
| is adjacent sentence left | 1 | 0 | 0 | 0 | 0 | 0 | 0 | 0 | 0 | 0 | 0 |
| is adjacent sentence right | 0 | 0 | 0 | 0 | 0 | 0 | 0 | 0 | 0 | 0 | 1 |
| is adjacent clause left | 1 | 0 | 0 | 0 | 0 | 0 | 0 | 0 | 0 | 0 | 0 |
| is adjacent clause right | 0 | 0 | 0 | 0 | 0 | 0 | 0 | 0 | 0 | 0 | 1 |
| is adjacent phrase left | 1 | 0 | 0 | 0 | 0 | 1 | 0 | 0 | 0 | 0 | 0 |
| is adjacent phrase right | 0 | 0 | 0 | 0 | 1 | 0 | 0 | 0 | 0 | 0 | 1 |
| is adjacent word left | 1 | 0 | 1 | 0 | 0 | 1 | 0 | 0 | 1 | 0 | 0 |
| is adjacent word right | 0 | 1 | 0 | 0 | 1 | 0 | 0 | 1 | 0 | 0 | 1 |
| is adjacent syllable left | 1 | 0 | 1 | 0 | 0 | 1 | 0 | 0 | 1 | 1 | 0 |
| is adjacent syllable right | 0 | 1 | 0 | 0 | 1 | 0 | 0 | 1 | 1 | 0 | 1 |

In order to provide the neural network with sufficient contextual information for learning lexical-postlexical conversion, a sliding window of nine phones is employed for presenting Streams 2 and 3 to the network. Streams 4 and 5 already encode contextual information, so they are not windowed. 10 Padding blocks, labeled PAD in the figures, are inserted between sentences, in order to prevent data from different sentences from appearing in the same window.

Figure 14:
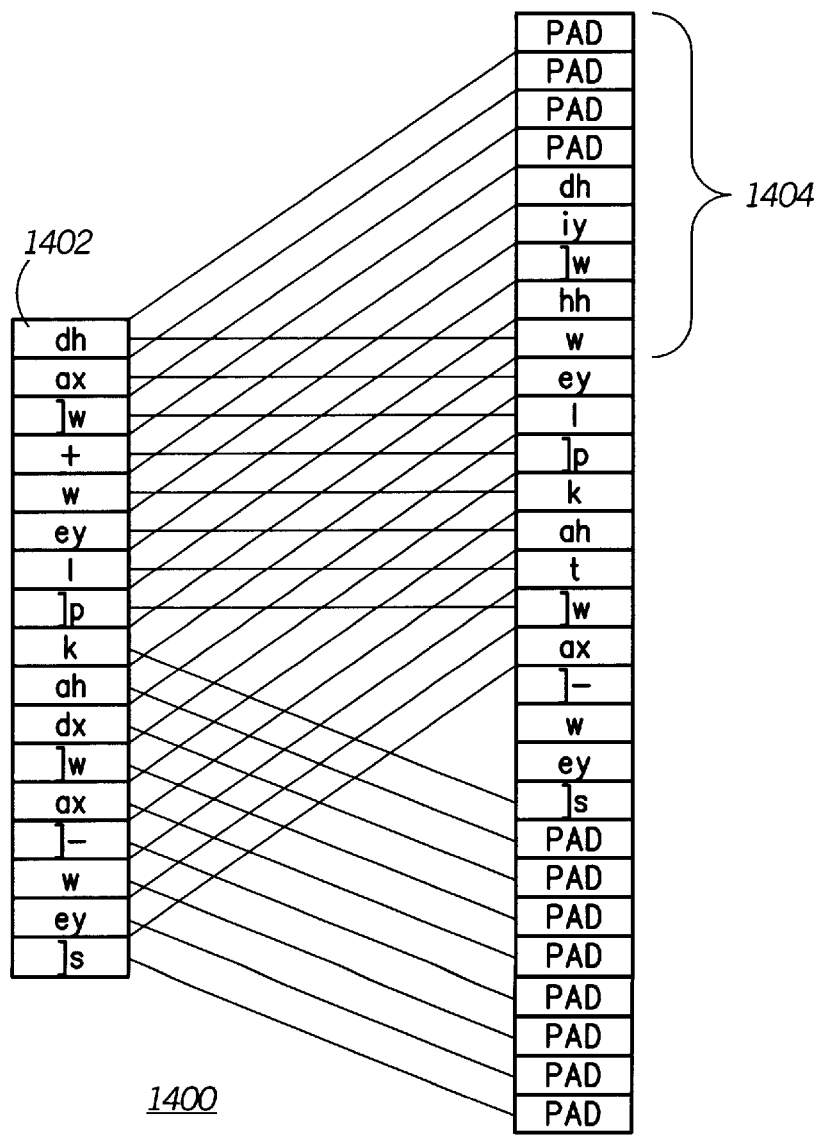
FIG. 14 is a schematic representation of a sliding window for lexical-postlexical neural network training in accordance with the present invention.
Figure 15:
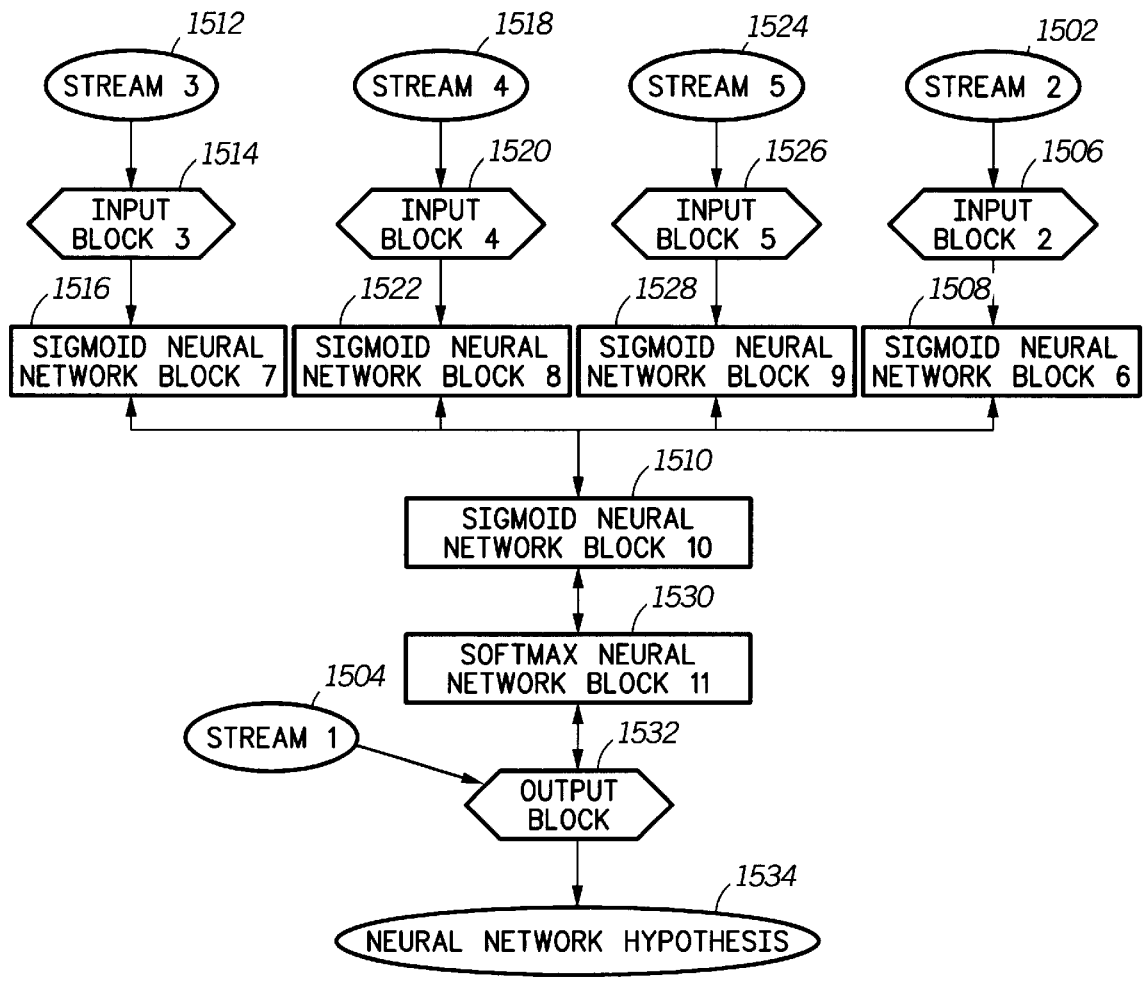
FIG. 15 is a schematic representation of one embodiment of the lexical-postlexical neural network architecture for training in accordance with the present invention.

FIG. 14, numeral 1400, illustrates such a window by indicating which lexical phones are viewed for each postlexical phone. FIG. 15, numeral 1500, shows the neural network architecture for training. From Stream 2 (1502), 9 input lexical phones surrounding the output postlexical phone in Stream 1 (1504), are passed from input block 2 (1506) to neural network block 6 (1508). For example, in FIG. 14, when Stream 1 consists of postlexical phone [dh] (1402), a nine-phone window (1404) consisting of PAD, PAD, PAD, PAD, /dh/, /iy/, ]w, /hh/ and /w/ is passed from input block 2 (1506) to input block 6 (1508).

In addition to providing contextual detail, the sliding window prevents the network from making too much of seeing a particular phone in a particular word position.

The neural network produces an output vector based on its input vectors, Streams 2, 3, 4 and 5 and the internal transfer functions used by the processing elements (PE's). The coefficients used in the transfer functions are varied during the training process to vary the output vector. The transfer functions and coefficients are collectively referred to as the weights of the neural network, and the weights are varied in the training process to vary the output vector produced by given input vectors. The weights are set to small random values initially. At the beginning of the training session, the associated postlexical representation is not meaningful since the neural network weights are random values. An error signal vector is generated in proportion to the distance between the associated phonetic representation and the assigned target phonetic representation, Stream 1.

In contrast to prior approaches, the error signal is not simply calculated to be the raw distance between the associated phonetic representation and the target phonetic representation, by for example using a Euclidean distance measure, shown in Equation 1. Rather, the distance is a function of how close the associated phonetic representation is to the target phonetic representation in featural space. Closeness in featural space is assumed to be related to closeness in perceptual space if the phonetic representations were uttered.

$$E = \sum_k ((d_k - o_k)^2) \qquad \text{Equation 1}$$

Figure 17:
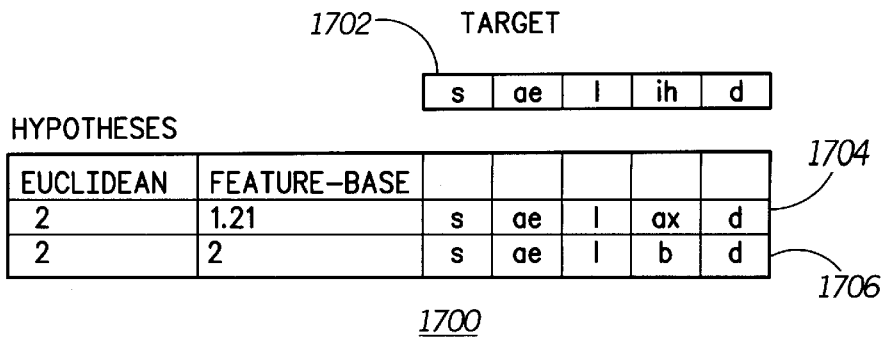
FIG. 17 is a schematic representation comparing the Euclidean error measure with the feature-based error measure used in accordance with the present invention.

FIG. 17, numeral 1700, contrasts the Euclidean distance error measure with the feature-based error measure. The target postlexical pronunciation (1702) is [saelihd] for the orthography salad. Two potential associated pronunciations are shown: [saelaxd] (1704) and [saelbd] (1706). [saelaxd] (1704) is perceptually very similar to the target pronunciation, whereas [saelbd] (1706) is quite far, in addition to being virtually unpronounceable. The Euclidean distance measure merely counts the number of items that are distinct in the target and associated vectors. By this measure, both [saelaxd] (1704) and [saelbd] (1706) receive an error score of 2 with respect to the target pronunciation. The two identical scores obscure the perceptual difference between the two pronunciations.

In contrast, the feature-based error measure takes into consideration that [ih] and [ax] are perceptually very similar, and consequently weights the local error when [ax] is hypothesized for [ih]. A scale of 0 for identity and 1 for maximum difference is established, and the various phone oppositions are given a score along this dimension. Table 12 provides a sample of feature-based error multipliers, or weights, that are used for American English. In this table, multipliers are the same whether the particular phones are part of the target or part of the hypothesis, but this does not have to be the case. Any combinations of target and hypothesis phones that are not in Table 12 are considered to have a multiplier of 1.

TABLE 12

| target phone | neural network phone hypothesis | error multiplier |
| --- | --- | --- |
| ax | ih | .1 |
| ih | ax | .1 |
| aa | ao | .1 |
| ao | aa | .3 |
| ow | ao | .5 |
| ao | ow | .5 |
| ae | aa | .5 |
| aa | ae | .5 |
| uw | ow | .7 |
| ow | uw | .7 |
| iy | ey | .7 |
| ey | iy | .7 |

FIG. 18, numeral 1800, shows how the unweighted local error is computed for the [ih] in [saelihd]. FIG. 19, numeral 1900, shows how the weighted error using the multipliers in Table 12 is computed. FIG. 19 shows how the error for [ax] where [ih] is expected is reduced by the multiplier, capturing the perceptual notion that this error is less egregious than hypothesizing [b] for [ih], whose error is unreduced.

After computation of the error signal, the weight values are adjusted in a direction to reduce the error signal. This process is repeated a number of times for the associated pairs of context descriptions and assigned target phonetic representations. This process of adjusting the weights to bring the associated phonetic representation closer to the assigned target phonetic representation is the training of the neural network. This training uses the standard back propagation of errors method. Once the neural network is trained, the weight values possess the information necessary to convert the context description to an output vector similar in value to the assigned target phonetic representation. The preferred neural network implementation requires up to ten million presentations of the context description to the inputs and the following weight adjustments before the neural network is considered fully trained.

The neural network contains blocks with two kinds of activation functions, sigmoid and softmax, as are known in the art. The softmax activation function is shown in Equation 2.

$$y_k = \frac{Ne^{l_k}}{\sum_{l=1} e^{l_k}}$$

Equation 2

FIG. 15 illustrates the neural network architecture for training a lexical pronunciation and associated information with a postlexical pronunciation. The neural network is constructed with a connected series of blocks which are associated with different functions, including whether the blocks are an input/output block, or a block with either a sigmoid or a softmax activation function.

Stream 2 (1502), the numeric encoding of a window of 9 lexical phones, is fed into input block 2 (1506). Input block 2 (1506) then passes this data onto sigmoid neural network block 6 (1508). Sigmoid neural network block 6 (1508) then passes the data onto sigmoid neural network block 10 (1510).

Stream 3 (1512), the numeric encoding of a window of the lexical phone features for 9 lexical phones, is fed into input block 3 (1514). Input block 3 (1514) then passes this data onto sigmoid neural network block 7 (1516). Sigmoid neural network block 7 (1516) then passes the data onto sigmoid neural network block 10 (1510).

Stream 4 (1518), the numeric encoding of the boundary distance information, is fed into input block 4 (1520). Input block 4 (1520) then passes this data onto sigmoid neural network block 8 (1522). Sigmoid neural network block 8 (1522) then passes the data onto sigmoid neural network block 10 (1510).

Stream 5 (1524), the numeric encoding of the boundary distance information, is fed into input block 5 (1526). Input block 5 (1526) then passes this data onto sigmoid neural network block 9 (1528). Sigmoid neural network block 9 (1528) then passes the data onto sigmoid neural network block 10 (1510).

Sigmoid neural network block 10 (1510) passes the data onto softmax neural network block 11 (1530).

Stream 1 (1504), the numeric encoding of the target phones, is fed into output block 1 (1532).

Softmax neural network block 11 (1530) outputs the most likely phone given the input information to output block 1 (1532). Output block 1 (1532) then outputs the data as the neural network hypothesis (1534). The neural network hypothesis (1534) is compared to Stream 1 (1504), the target postlexical phone, by means of the feature-based error function described above.

The error determined by the error function is then back-propagated to softmax neural network block 11 (1530), which in turn backpropagates the error to sigmoid neural network block 10 (1510), which in turn backpropagates the error to sigmoid neural network blocks 6 (1508), 7 (1516), 8 (1522) and 9 (1528).

The double arrows between neural network blocks in FIG. 15 indicate both the forward and backward movement through the network.

Figure 3:
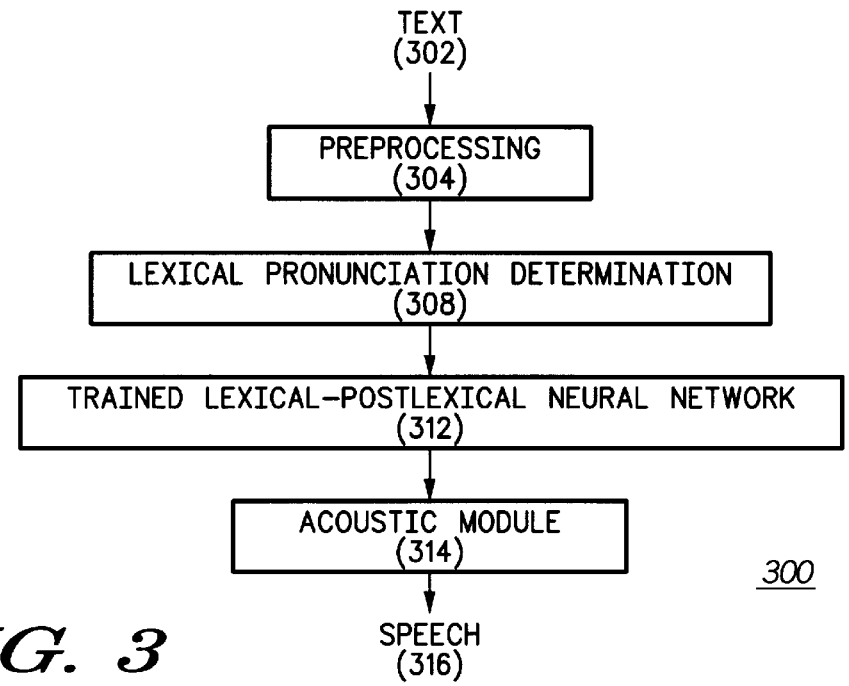
FIG. 3 is a schematic representation of one embodiment of the transformation of text to speech employing the neural network lexical-postlexical converter in accordance with the present invention.

FIG. 5, numeral 500, shows the neural network lexical-postlexical converter of FIG. 3, numeral 310, in detail. Lexical pronunciations for an entire sentence are collected, a word at a time, allowing for the calculation of boundary distance information and boundary adjacency information for each lexical phone. Each word-sized lexical pronunciation is coded into neural network input format (504). The coded lexical pronunciation is then submitted to the trained neural network (506). This is called testing the neural network. The trained neural network outputs an encoded postlexical pronunciation, which must be decoded by the neural network output decoder (508) into a postlexical pronunciation (510).

Figure 13:
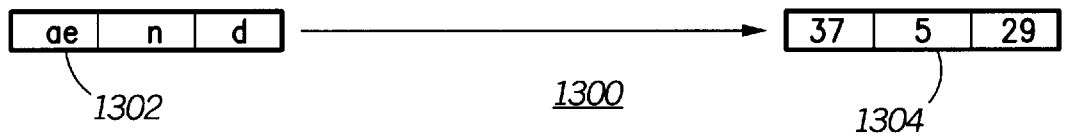
FIG. 13 is a schematic representation of the encoding of Stream 2 of FIG. 9 for testing the lexical-postlexical neural network in accordance with the present invention.

When the network is tested, only Streams 2, 3, 4 and 5 need be encoded. The encoding of Stream 2 for testing is shown in FIG. 13, numeral 1300. Each lexical phone (1302) is converted to a numeric code by consulting the lexical phone table in Table 1. Each lexical phone's numeric code is then loaded into a storage buffer for Stream 2 (1304) Stream 3 is encoded as shown in FIG. 11. Stream 4 is encoded as shown in Table 10. Stream 5 is encoded as shown in Table 11. A word is tested by encoding Streams 2, 3, 4 and 5 for that word and testing the neural network.

Figure 12:
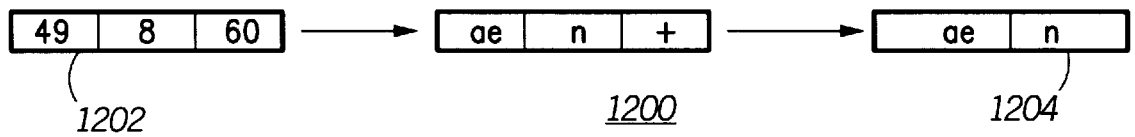
FIG. 12 is a schematic representation of the decoding of Stream 1 of FIG. 15 for testing the lexical-postlexical neural network in accordance with the present invention.

The neural network returns an output postlexical pronunciation hypothesis. The neural network hypothesis is then decoded, as shown in FIG. 12, numeral 1200, by converting numbers (1202) to phones (1204) by consulting the phone number table in Table 2, and removing any alignment separators, which is number 60, and breaking any collapsed postlexical phones into their component parts by consulting Table 13.

TABLE 13

| postlexical phone combination | collapsed postlexical phone |
|---|---|
| q + aa | AA |
| q + ae | AE |
| q + ah | AH |
| q + ao | AO |
| q + aw | AW |
| q + ax | AX |
| q + axr | AXR |
| q + ix | IX |
| q + iy | IY |
| q + ih | IH |
| q + ax-h | AX-H |
| q + ay | AY |
| q + eh | EH |
| q + el | EL |
| q + em | EM |
| q + er | ER |
| q + ey | EY |
| q + ow | OW |
| q + oy | OY |
| q + uh | UH |
| q + uw | UW |
| q + ux | UX |
| bcl + b | B |
| dcl + d | D |
| gcl + g | G |
| pcl + p | P |
| tcl + t | T |
| kcl + k | K |
| dcl + jh | JH |
| tcl + ch | CH |

Figure 9:
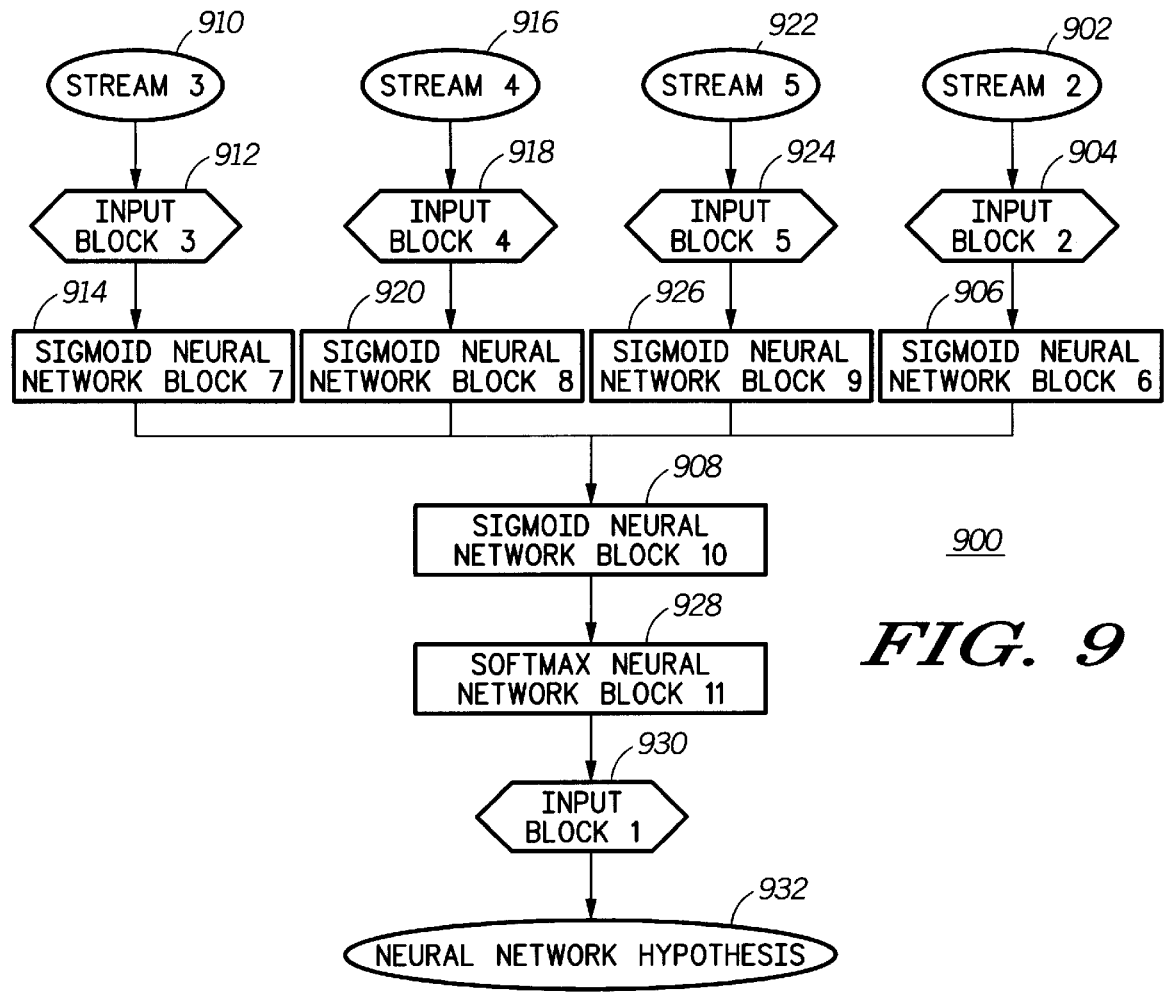
FIG. 9 is a schematic representation of one embodiment of the architecture of the lexical-postlexical neural network used for testing in accordance with the present invention.

FIG. 9, numeral 900, shows how the encoded streams fit into the neural network architecture for testing. Stream 2 (902), the numeric encoding of a window of 9 lexical phones, is fed into input block 2 (904). Input block 2 (904) then passes this data onto sigmoid neural network block 6 (906). Sigmoid neural network block 6 (906) then passes the data for each letter into sigmoid neural network block 10 (908).

Stream 3 (910), the numeric encoding of a window of the lexical phone features for 9 lexical phones of the input lexical pronunciation, is fed into input block 3 (912). Input block 3 then passes this data onto sigmoid neural network block 7 (914). Sigmoid neural network block 7 (914) then passes the data for each lexical phone's features into sigmoid neural network block 10 (908).

Stream 4 (916), the numeric encoding of the boundary distance information of the input lexical pronunciation, encoded as shown in Table 10, is fed into input block 4 (918). Input block 4 then passes this data onto sigmoid neural network block 8 (920). Sigmoid neural network block 8 (920) then passes the data for each lexical phone's boundary distance information into sigmoid neural network block 10 (908).

Stream 5 (922), the numeric encoding of the boundary adjacency information of the input lexical pronunciation, encoded as shown in Table 11, is fed into input block 5 (924). Input block 5 (924) then passes this data onto sigmoid neural network block 9 (926). Sigmoid neural network block 9 (926) then passes the data for each lexical phone's boundary adjacency information into sigmoid neural network block 10 (908).

Sigmoid neural network block 10 (908) passes its data onto softmax neural network block 11 (928).

Softmax neural network 11 (928) outputs the most likely phone given the input information to output block 1 (930). Output block 1 (930) then outputs the data as the neural network hypothesis (932) for the postlexical phone.

Figure 16:
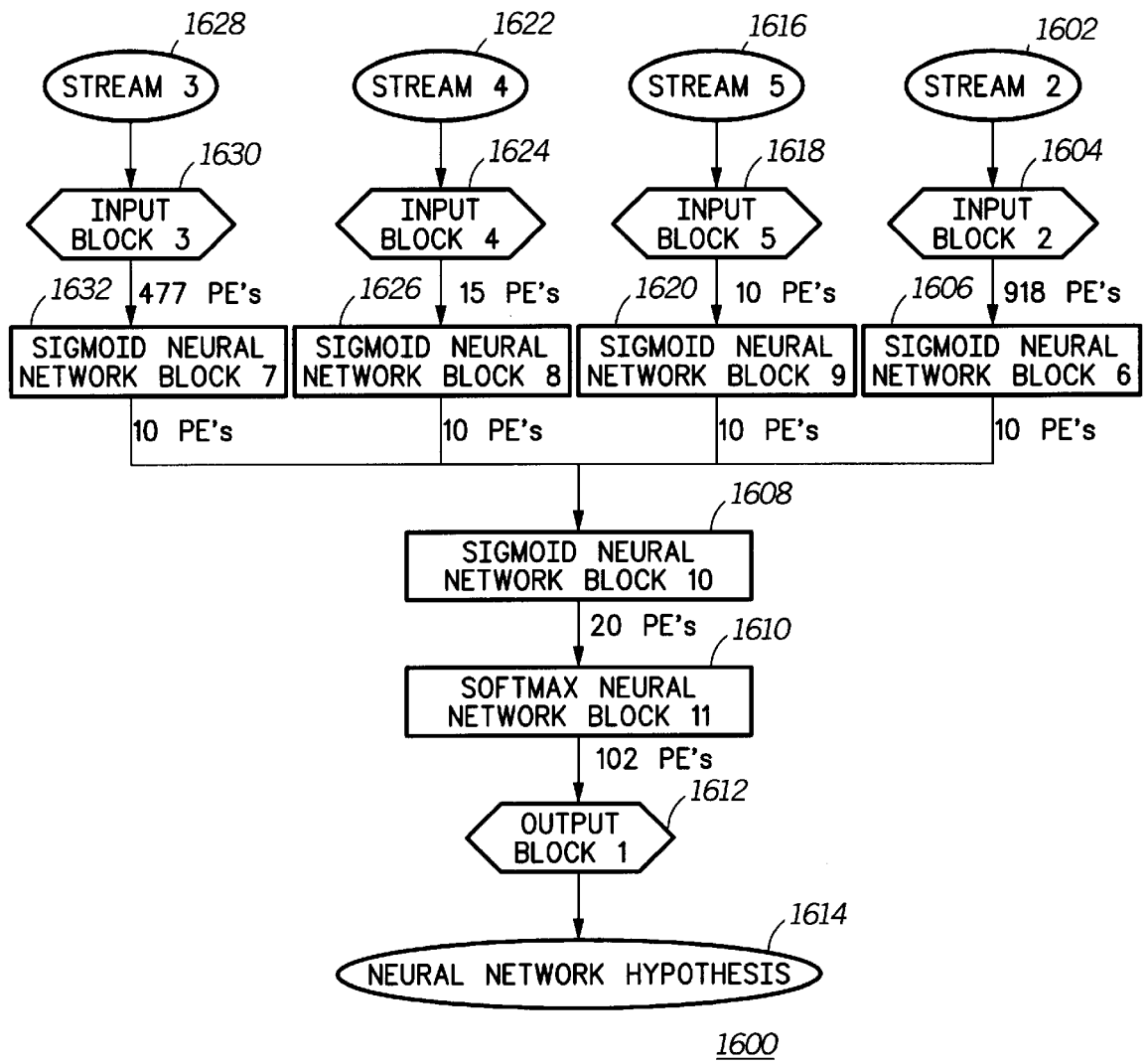
FIG. 16 is a schematic representation of one embodiment of the lexical-postlexical neural network, depicting the number of PE's employed in accordance with the present invention.

FIG. 16, numeral 1600, presents an illustration of the neural network in which the number of PE's connecting each block is shown. Input stream 2 (1602), containing a numeric encoding of lexical phones, loads its data into input block 2 (1604). Input block 2 (1604) contains 918 PE's, which is the size required for a nine phone window, where each phone could be one of 102 distinct characters. Input block 2 (1604) passes these 918 PE's to sigmoid neural network block 6 (1606).

Sigmoid neural network block 6 (1606) passes 10 PE's to sigmoid neural network block 10 (1608).

Input stream 3 (1628), containing a numeric encoding of lexical phone features, encoded as shown in FIG. 11, loads its data into input block 3 (1630). Input block 3 (1630) contains 477 PE's which is the size required for a lexical phone window of 9, where lexical phone is represented by up 53 activated features. Input block 3 (1630) passes these 477 PE's to sigmoid neural network block 7 (1632).

Sigmoid neural network block 7 (1632) passes 10 PE's to sigmoid neural network block 10 (1608).

Input stream 4 (1622), containing a numeric encoding of boundary distance information, encoded as shown in Table 10, loads its data into input block 4 (1624). Input block 4 (1624) contains 15 PE's which is the size required for each of the boundary distances. Input block 4 (1624) passes these 15 PE's to sigmoid neural network block 8 (1626).

Sigmoid neural network block 8 (1626) passes 10 PE's to sigmoid neural network block 10 (1608).

Input stream 5 (1616), containing a numeric encoding of boundary adjacency information, encoded as shown in Table 11, loads its data into input block 5 (1618). Input block 5 (1618) contains 10 PE's which is the size required for each of the boundary adjacency values. Input block 5 (1618) passes 10 PE's to sigmoid neural network block 9 (1620).

Sigmoid neural network block 9 (1620) passes 10 PE's to sigmoid neural network block 10 (1608).

Sigmoid neural network block 10 (1608) passes 20 PE's to softmax neural network block 11 (1610). Softmax neural network block 11 (1610) passes 102 PE's representing possible postlexical phones to output block 1 (1612).

The approach to lexical-postlexical conversion described here has an advantage over rule-based systems in that it is easily adaptable to any language. For each language, all that is required is that an orthography-phonetics lexicon in that language, a postlexical-lexical phone cost table in that language, and a postlexically labeled speech database. It may also be necessary to use characters from the International Phonetic Alphabet, so the full range of phonetic variation in the world's languages is possible to model.

A method, device and article of manufacture provide, in response to lexical pronunciation information, efficient generation of postlexical pronunciation information. A neural network is trained on associated lexical-postlexical pronunciation data, which is aligned using dynamic programming enhanced with a featural distance measure. Feature values for lexical phones are supplied as input to the neural network. Boundary distance and boundary adjacency information for each lexical phone is provided to the neural network. A window including a plurality of lexical phones and lexical phone features is provided to the neural network in order to provide the network with helpful context information.

As shown in FIG. 20, numeral 2000, the present invention implements a method for providing, in response to a lexical pronunciation, efficient generation of a postlexical pronunciation, including the steps of: (2002) determining lexical phones, lexical features, and boundary information for a predetermined portion of text; and utilizing (2004) a pretrained neural network that was pretrained using lexical phones, postlexical phones, lexical features, and boundary information to generate a neural network hypothesis for a postlexical pronunciation of the predetermined portion of text.

In the preferred embodiment, the boundary information includes at least one of: boundary distance information and boundary adjacency information.

Figure 21:
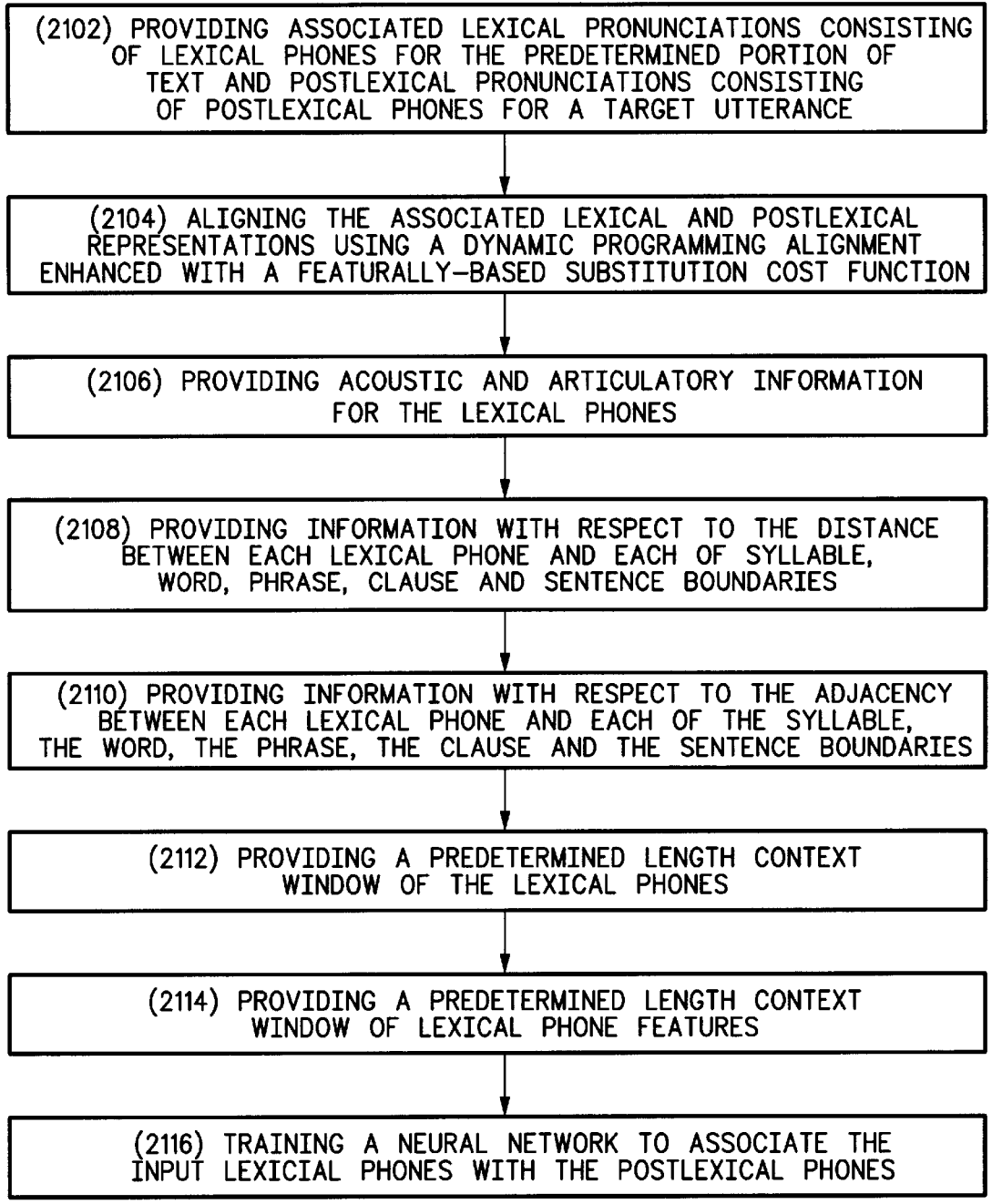
FIG. 21 is a flowchart of one embodiment of steps for transforming lexical pronunciations into postlexical pronunciations by a neural network in accordance with the present invention.

As shown in FIG. 21, numeral 2100, the pretrained neural network (2004) has been trained using the steps of: providing (2102) associated lexical pronunciations consisting of lexical phones for the predetermined portion of text and postlexical pronunciations consisting of postlexical phones for a target utterance; aligning (2104) the associated lexical and postlexical representations using a dynamic programming alignment enhanced with a featurally-based substitution cost function; providing (2106) acoustic and articulatory information for the lexical phones; providing (2108) information with respect to the distance between each lexical phone and each of syllable, word, phrase, clause and sentence boundaries; providing (2110) information with respect to the adjacency between each lexical phone and each of the syllable, the word, the phrase, the clause and the sentence boundaries; providing (2112) a predetermined length context window of the lexical phones; providing (2114) a predetermined length context window of lexical phone features; and training (2116) a neural network to associate the input lexical phones with the postlexical phones.

In a preferred embodiment, the postlexical neural network (2004), employs a feature-based error function to characterize the distance between target and hypothesized postlexical pronunciations.

The postlexical neural network (2004) may be a feed-forward neural network.

The postlexical neural network (2004) may use back-propagation of errors.

The postlexical neural network (2004) may have a recurrent input structure.

The lexical features (2002) may include articulatory features.

The lexical features (2002) may include acoustic features.

The lexical features (2002) may include a geometry of articulatory features.

The lexical features (2002) may include a geometry of acoustic features.

The alignment (2104) may be based on consonant and vowel locations in the orthography and associated phonetic representation.

The lexical phones and postlexical phones (2004) may be described using a feature vector.

The featurally-based substitution cost function (2104) uses predetermined substitution, insertion and deletion costs and a predetermined substitution table.

The neural network (2004) may be trained using intonational information.

Figure 22:
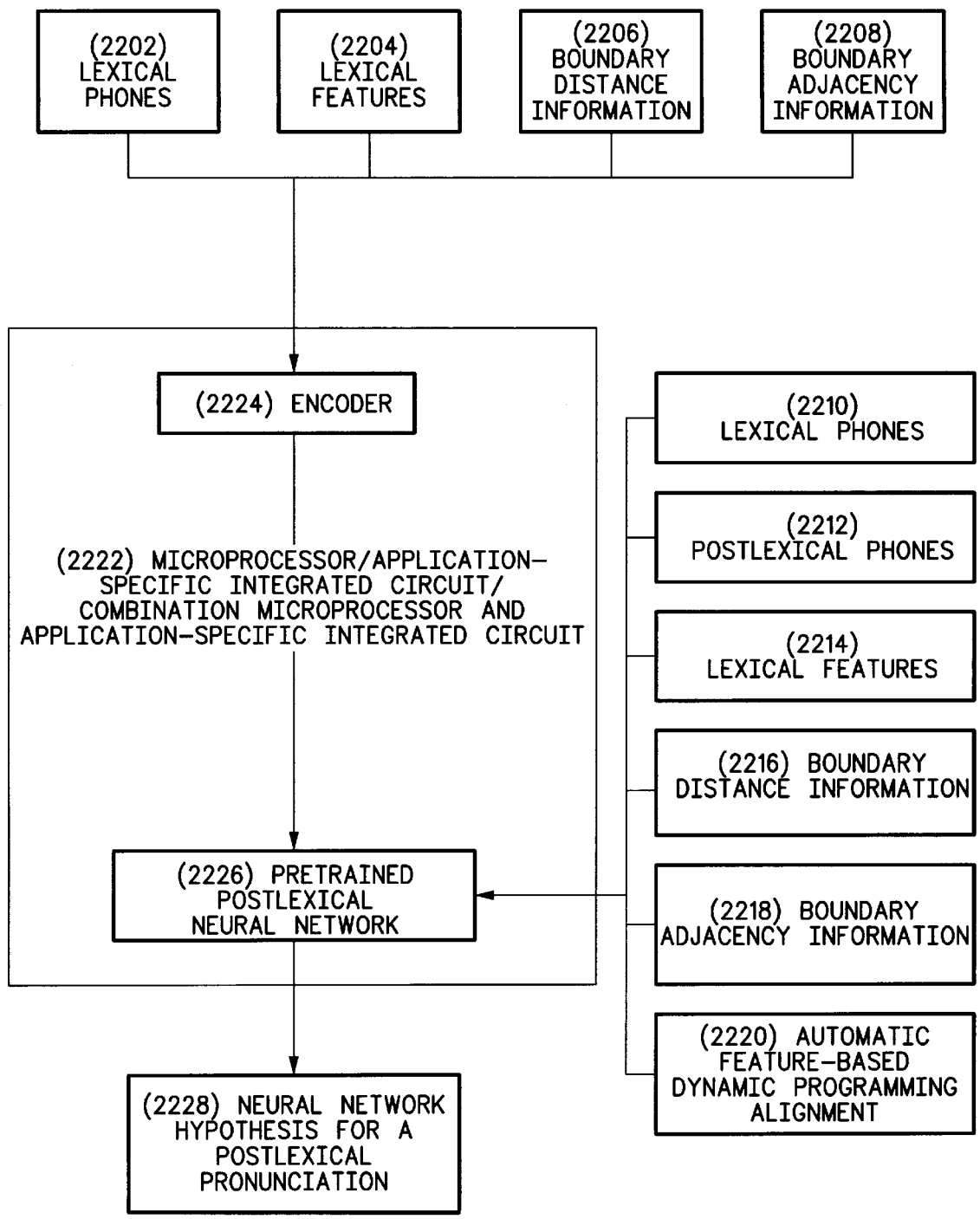
FIG. 22 is a schematic representation of a microprocessor/application-specific integrated circuit/combination microprocessor and application-specific integrated circuit for generating postlexical pronunciations from lexical pronunciations in accordance with the present invention.

The neural network (2004) may be trained using prosodic information. As shown in FIG. 22, numeral 2200, the present invention implements a device, including at least one of a microprocessor, an application specific integrated circuit and a combination of a microprocessor and an application specific integrated circuit, for providing, in response to a lexical pronunciation, efficient generation of a postlexical pronunciation, including: an encoder (2224), coupled to receive lexical phones (2202), lexical features (2204), boundary distance information (2206) and boundary adjacency information (2208) for a predetermined portion of text, for providing digital input to a pretrained postlexical neural network (2226), wherein the pretrained postlexical neural network (2226) has been trained using lexical phones (2210), postlexical phones (2212), lexical features (2214), boundary distance information (2216) and boundary adjacency information (2218) and where the lexical and postlexical phones have been aligned using an automatic feature-based dynamic programming alignment (2220); and a pretrained postlexical neural network (2226), coupled to the encoder (2224), for generating a neural network hypothesis for a postlexical pronunciation (2229) of the predetermined portion of text.

As shown in FIG. 21, the pretrained postlexical neural network (2226) has been trained in accordance with the following scheme: providing (2102) associated lexical pronunciations consisting of lexical phones for the predetermined portion of text and postlexical pronunciations consisting of postlexical phones for a target utterance; (2104) aligning the associated lexical and postlexical representations using a dynamic programming alignment enhanced with a featurally-based substitution cost function; providing (2106) acoustic and articulatory information for the lexical phones; providing (2108) information with respect to the distance between each lexical phone and each of syllable, word, phrase, clause and sentence boundaries; providing (2110) information with respect to the adjacency between each lexical phone and each of the syllable, the word, the phrase, the clause and the sentence boundaries; providing (2112) a predetermined length context window of the lexical phones; providing (2114) a predetermined length context window of lexical phone features; and training (2116) a neural network to associate the input lexical phones with the postlexical phones.

In a preferred embodiment, the postlexical neural network (2226) employs a feature-based error function to characterize the distance between target and hypothesized postlexical pronunciations.

The postlexical neural network (2226) may be a feed-forward neural network.

The postlexical neural network (2226) may use back-propagation of errors.

The postlexical neural network (2226) may have a recurrent input structure.

The lexical features, (2204) and (2214), may include articulatory features.

The lexical features, (2204) and (2214), may include acoustic features.

The lexical features, (2204) and (2214), may include a geometry of articulatory features.

The lexical features, (2204) and (2214), may include a geometry of acoustic features.

The alignment (2220) may be based on consonant and vowel locations in the orthography and associated phonetic representation.

The lexical phones (2202) and (2210) and postlexical phones (2212) may be described using feature vectors.

The featurally-based substitution cost function (2104) uses predetermined substitution, insertion and deletion costs and a predetermined substitution table.

The postlexical neural network (2226) may be trained using intonational information.

The postlexical neural network (2226) may be trained using prosodic information.

Figure 23:
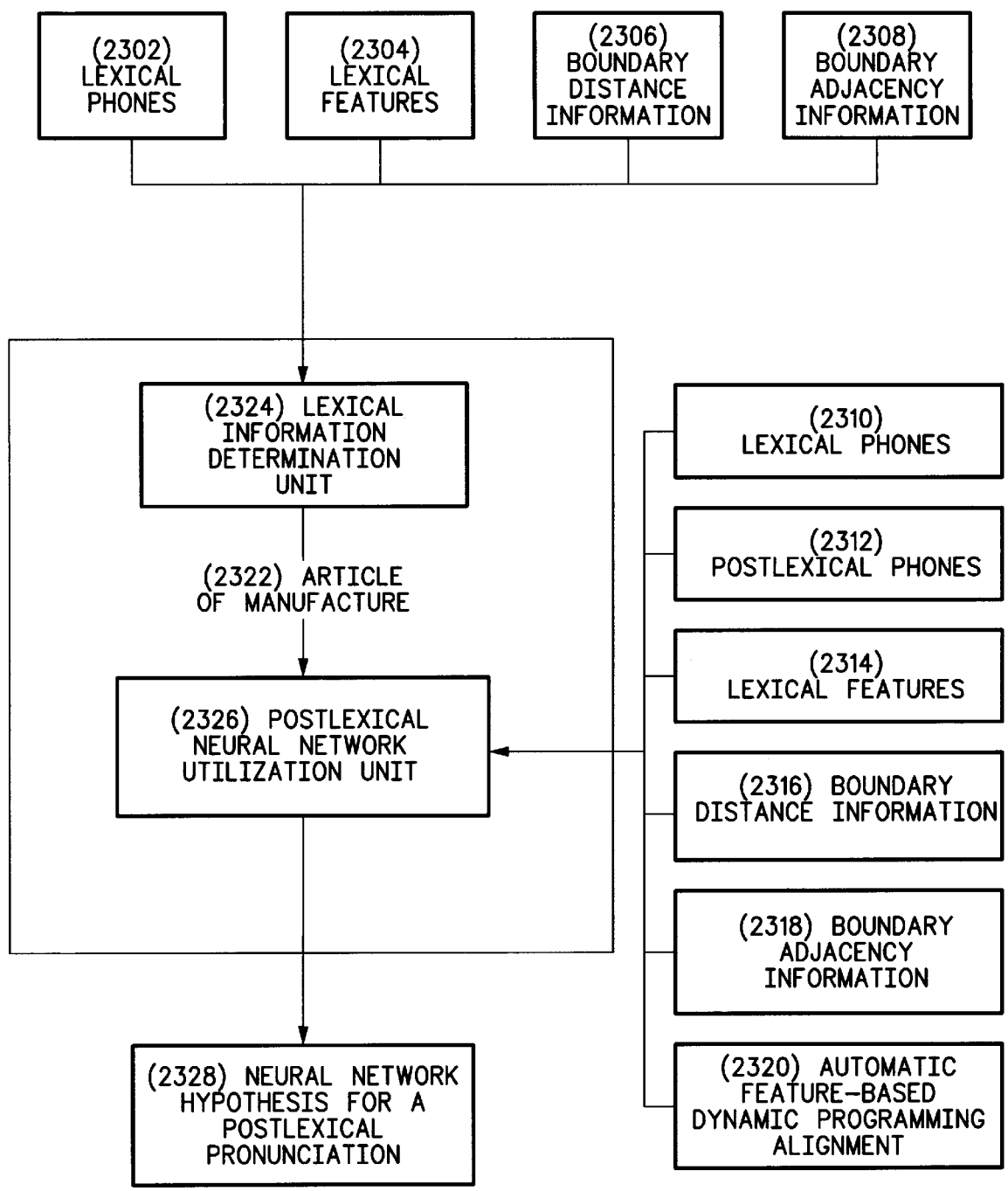
FIG. 23 is a schematic representation of an article of manufacture for generating postlexical pronunciations from lexical pronunciations in accordance with the present invention.

As shown in FIG. 23, numeral 2300, the present invention implements an article of manufacture (2322), i.e. software, for generating postlexical pronunciations from lexical pronunciations, including a computer usable medium having computer readable program code means thereon including: a lexical information determination unit (2324) for determining lexical phones (2302), lexical features (2304), boundary distance information (2306) and boundary adjacency information (2308) for a predetermined portion of text; and a postlexical neural network utilization unit (2326) for utilizing a pretrained neural network that was pretrained using lexical phones (2310), postlexical phones (2312), lexical features (2314), boundary distance information (2316) and boundary adjacency information (2318) to generate a neural network hypothesis for a postlexical pronunciation (2328) of the predetermined portion of text.

As shown in FIG. 21, the postlexical neural network utilization unit (2326) has been trained in accordance with the following scheme: providing (2102) associated lexical pronunciations consisting of lexical phones for the predetermined portion of text and postlexical pronunciations consisting of postlexical phones for a target utterance; aligning (2104) the associated lexical and postlexical representations using a dynamic programming alignment enhanced with a featurally-based substitution cost function; providing (2106) acoustic and articulatory information for the lexical phones; providing (2108) information with respect to the distance between each lexical phone and each of syllable, word, phrase, clause and sentence boundaries; providing (2210) information with respect to the adjacency between each lexical phone and each of the syllable, the word, the phrase, the clause and the sentence boundaries; providing (2112) a predetermined length context window of the lexical phones; providing (2114) a predetermined length context window of lexical phone features; and training (2116) a neural network to associate the input lexical phones with the postlexical phones.

In a preferred embodiment, the neural network utlization unit (2326) employs a feature-based error function to characterize the distance between target and hypothesized postlexical pronunciations.

The postlexical neural network utilization unit (2326) may be a feed-forward neural network.

The postlexical neural network utilization unit (2326) may use backpropagation of errors.

The postlexical neural network utilization unit (2326) may have a recurrent input structure.

The lexical features, (2304) and (2314), may include articulatory features.

The lexical features, (2304) and (2314), may include acoustic features.

The lexical features, (2304) and (2314), may include a geometry of articulatory features.

The lexical features, (2304) and (2314), may include a geometry of acoustic features.

The alignment (2320) may be based on consonant and vowel locations in the orthography and associated phonetic representation.

The lexical phones, (2302) and (2310) are described using may be described using feature vectors.

The postlexical phones are described using a feature vector.

The featurally-based substitution cost function (2104) uses predetermined substitution, insertion and deletion costs and a predetermined substitution table.

The postlexical neural network utilization unit (2326) may be trained using intonational information.

The postlexical neural network utilization unit (2326) may be trained using prosodic information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing, in response to a lexical pronunciation, efficient generation of a postlexical pronunciation, comprising the steps of:
   a) determining lexical phones, lexical features, and boundary information for a predetermined portion of text; and
   b) utilizing a pretrained neural network that was pretrained using lexical phones, postlexical phones, lexical features, and boundary information to generate a neural network hypothesis for a postlexical pronunciation of the predetermined portion of text, the pretrained neural network having been trained using at least the steps of:
      providing a predetermined length context window of the lexical phones;
      providing a predetermined length context window of lexical phone features.

2. The method of claim 1 wherein the pretrained neural network has been trained using the steps of:
   a) providing associated lexical pronunciations consisting of lexical phones for the predetermined portion of text and postlexical pronunciations consisting of postlexical phones for a target utterance;
   b) aligning the associated lexical and postlexical representations using a dynamic programming alignment enhanced with a featurally-based substitution cost function;
   c) providing acoustic and articulatory information for the lexical phones;
   d) providing information with respect to the distance between each lexical phone and each of syllable, word, phrase, clause and sentence boundaries;
   e) providing information with respect to the adjacency between each lexical phone and each of the syllable, the word, the phrase, the clause and the sentence boundaries;
   f) providing the predetermined length context window of the lexical phones;
   g) providing the predetermined length context window of lexical phone features; and
   h) training a neural network to associate the input lexical phones with the postlexical phones.

3. The method of claim 2 further including, in step (h), employing a feature-based error function to characterize the distance between target and hypothesized postlexical pronunciations.

4. The method of claim 2, step (b), wherein the alignment is based on consonant and vowel locations in the orthography and associated phonetic representation.

5. The method of claim 2, step (b), wherein the featurally-based substitution cost function uses predetermined substitution, insertion and deletion costs and a predetermined substitution table.

6. The method of claim 1, step (b), wherein the neural network is a feed-forward neural network.

7. The method of claim 1, step (b), wherein the neural network uses backpropagation of errors.

8. The method of claim 1, wherein the lexical features include articulatory features.

9. The method of claim 1, wherein the lexical features include acoustic features.

10. The method of claim 1, wherein the lexical features include a geometry of articulatory features.

11. The method of claim 1, wherein the lexical features include a geometry of acoustic features.

12. The method of claim 1, wherein the lexical phones are described using a feature vector.

13. The method of claim 1, wherein the postlexical phones are described using a feature vector.

14. The method of claim 1, step (b), wherein the neural network is trained using intonational information.

15. The method of claim 1, step (b), wherein the neural network is trained using prosodic information.

16. The method of claim 1, step (b), comprising generating a single neural network hypothesis for a postlexical pronunciation of the predetermined portion of text.

17. A device for providing, in response to a lexical pronunciation, efficient generation of a postlexical pronunciation, comprising:
   a) an encoder, coupled to receive lexical phones, lexical features, boundary distance information and boundary adjacency infomation for a predetermined portion of text, for providing digital input to a pretrained postlexical neural network, wherein the pretrained postlexical neural network has been trained using lexical phones, postlexical phones, lexical features, boundary distance information and boundary adjacency information and where the lexical and postlexical phones have been aligned using an automatic feature-based dynamic programming alignment; and
   b) a pretrained postlexical neural network, coupled to the encoder, for generating a neural network hypothesis for a postlexical pronunciation of the predetermined portion of text, the pretrained neural network having been trained using at least the steps of:
      providing a predetermined length context window of the lexical phones;
      providing a predetermined length context window of lexical phone features.

18. The device of claim 17 wherein the pretrained neural network has been trained in accordance with the following scheme:
   a) providing associated lexical pronunciations consisting of lexical phones for the predetermined portion of text and postlexical pronunciations consisting of postlexical phones for a target utterance;
   b) aligning the associated lexical and postlexical representations using a dynamic programming alignment enhanced with a featurally-based substitution cost function;
   c) providing acoustic and articulatory information for the lexical phones;
   d) providing information with respect to the distance between each lexical phone and each of syllable, word, phrase, clause and sentence boundaries;
   e) providing information with respect to the adjacency between each lexical phone and each of the syllable, the word, the phrase, the clause and the sentence boundaries;
   f) providing the predetermined length context window of the lexical phones;
   g) providing the predetermined length context window of lexical phone features; and
   h) training a neural network to associate the input lexical phones with the postlexical phones.

19. The device of claim 18, step (b), wherein the alignment is based on consonant and vowel locations in the orthography and associated phonetic representation.

20. the device of claim 18, step (b), wherein the featurally-based substitution cost function uses predetermined substitution, insertikon and deletion costs and a predetermined substitution table.

21. The device of claim 17 further including, during training, employing a feature-based error function to characterize the distance between target and hypothesized postlexical pronunciations.

22. The device of claim 17 wherein the device includes at least one of:
   a) a microprocessor;
   b) application specific integrated circuit; and
   c) a combination of (a) and (b).

23. The device of claim 17, step (b), wherein the neural network is a feed-forward neural network.

24. The device of claim 17, step (b), wherein the neural network uses backpropagation of errors.

25. The device of claim 17, wherein the lexical features include articulatory features.

26. The device of claim 17, wherein the lexical features include acoustic features.

27. The device of claim 17, wherein the lexical features include a geometry of articulatory features.

28. The device of claim 17, wherein the lexical features include a geometry of acoustic features.

29. The device of claim 17, wherein the lexical phones are described using a feature vector.

30. The device of claim 17, wherein the postlexical phones are described using a feature vector.

31. The device of claim 17, step (b), wherein the neural network is trained using intonational information.

32. The device of claim 17, step (b), wherein the neural network is trained using prosodic information.

33. The device of claim 17 being joperable to generate a single neural network hypothesis for postlexical pronunciation of the predetermined portion of text.

34. An article of manufacture for generating postlexical pronunciations from lexical pronunciations, comprising a computer usable medium having computer readable program code means thereon comprising:
   a) lexical information determination means for determining lexical phones, lexical features, boundary distance information and boundary adjacency information for a predetermined portion of text; and
   b) postlexical neural network utilization means for utilizing a pretrained neural network that was pretrained using lexical phones, postlexical phones, lexical features, boundary distance information and boundary adjacency information to generate a neural network hypothesis for a postlexical pronunciation of the predetermined portion of text, the pretrained neural network having been trained using at least the steps of:
  providing a predetermined length context window of the lexical phones;
  providing a predetermined length context window of lexical phone features.

35. The article of manufacture of claim 34 wherein the pretrained neural network has been trained in accordance with the following scheme:
  a) providing associated lexical pronunciations consisting of lexical phones for the predetermined portion of text and postlexical pronunciations consisting of postlexical phones for a target utterance;
  b) aligning the associated lexical and postlexical representations using a dynamic programming alignment enhanced with a featurally-based substitution cost function;
  c) providing acoustic and articulatory information for the lexical phones;
  d) providing information with respect to the distance between each lexical phone and each of syllable, word, phrase, clause and sentence boundaries;
  e) providing information with respect to the adjacency between each lexical phone and each of the syllable, the word, the phrase, the clause and the sentence boundaries;
  f) providing the predetermined length context window of the lexical phones;
  g) providing the predetermined length context window of lexical phone features; and
  h) training a neural network to associate the input lexical phones with the postlexical phones.

36. The article of manufacture of claim 35 further including, in step (h), employing a feature-based error function to characterize the distance between target and hypothesized postlexical pronunciations.

37. The article of manufacture of claim 35, step (b), wherein the alignment is based on consonant and vowel locations in the orthography and associated phonetic representation.

38. The article of manufacture of claim 35, step (b), wherein the featurally-based substitution cost function uses predetermined substitution, insertion and deletion costs and a predetermined substitution table.

39. The article of manufacture of claim 34, step (b), wherein the neural network is a feed-forward neural network.

40. The article of manufacture of claim 34, step (b), wherein the neural network uses backpropagation of errors.

41. The article of manufacture of claim 34, wherein the lexical features include articulatory features.

42. The article of manufacture of claim 34, wherein the lexical features include acoustic features.

43. The article of manufacture of claim 34, wherein the lexical features include a geometry of articulatory features.

44. The article of manufacture of claim 34, wherein the lexical features include a geometry of acoustic features.

45. The article of manufacture of claim 34, wherein the lexical phones are described using a feature vector.

46. The article of manufacture of claim 34, wherein the postlexical phones are described using a feature vector.

47. The article of manufacture of claim 34, step (b), wherein the neural network is trained using intonational information.

48. The article of manufacture of claim 34, step (b), wherein the neural network is trained using prosodic information.

49. The article of manufacture of claim 34, being operable to generate a single neural network hypothesis for a postlexical pronunciation of the predetermined portion of text.

* * * * *

UNITED STATES PATENT AND TRADEMARK OFFICE
CERTIFICATE OF CORRECTION

PATENT NO. : 6,134,528
DATED : October 17, 2000
INVENTOR(S) : Corey Miller, et al.

It is certified that error appears in the above-identified patent and that said Letters Patent is hereby corrected as shown below:

Claim 33, "joberable" should be -- operable --

Signed and Sealed this

Sixteenth Day of October, 2001

Attest:

NICHOLAS P. GODICI
*Attesting Officer*   *Acting Director of the United States Patent and Trademark Office*